(12) United States Patent
Rubin et al.

(10) Patent No.: US 7,458,014 B1
(45) Date of Patent: Nov. 25, 2008

(54) COMPUTER USER INTERFACE ARCHITECTURE WHEREIN BOTH CONTENT AND USER INTERFACE ARE COMPOSED OF DOCUMENTS WITH LINKS

(75) Inventors: Darryl E. Rubin, Redmond, WA (US);
Andrew C. Baird, Kirkland, WA (US);
John L. Beezer, Redmond, WA (US);
Jonathan C. Cluts, Redmond, WA (US);
Susan D. Woolf, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/457,109

(22) Filed: Dec. 7, 1999

(51) Int. Cl.
G06F 17/00 (2006.01)
G06F 15/177 (2006.01)

(52) U.S. Cl. .............. 715/229; 715/207; 715/234; 715/240; 715/752; 709/206

(58) Field of Classification Search ............ 715/500.1, 715/501.1, 513, 511, 516, 526, 200, 201, 715/205, 207, 226, 229, 234, 240, 251, 255, 715/273, 277, 738, 752, 760, 762, 804, 805, 715/851; 345/738; 709/201, 203, 206; 707/1, 707/10, E17.111
See application file for complete search history.

(56) References Cited

U.S. PATENT DOCUMENTS

| | | | |
|---|---|---|---|
| 5,146,552 | A | 9/1992 | Cassorla et al. |
| 5,237,648 | A | 8/1993 | Mills et al. |
| 5,239,466 | A | 8/1993 | Morgan et al. |
| RE34,476 | E | 12/1993 | Norwood |

(Continued)

FOREIGN PATENT DOCUMENTS

EP 0342838 A 11/1989

(Continued)

OTHER PUBLICATIONS

Crespo et al., "Responsive interaction for large Web application: the meteor shower architecture in the WebWriter II Editor," Computer Networks and ISDN System, 1997, pp. 1507-1517.*

(Continued)

*Primary Examiner*—Doug Hutton
*Assistant Examiner*—Maikhanh Nguyen
(74) *Attorney, Agent, or Firm*—Shook, Hardy & Bacon, L.L.P.

(57) ABSTRACT

A user interface architecture wherein user content and user interface are composed of documents with links is described. Links have properties that indicate how links should be displayed. Link display may depend upon characteristics of the linked-to frame. Commands are implemented as links that link to command code. The display format of a document page depends upon the path a user navigated in order to get to the displayed page. User content documents and user interface documents are both displayed in a single viewing frame. A non-linear navigation history is maintained such that a user can navigate along a first path, back up using a previous link, navigate along a second path, back up along the second path using the previous link, and re-navigate along the first path again using a next link. Every document page to which a user navigates is saved in the user's navigation history.

21 Claims, 11 Drawing Sheets

U.S. PATENT DOCUMENTS

| | | |
|---|---|---|
| 5,347,295 A | 9/1994 | Agulnick et al. |
| 5,390,138 A | 2/1995 | Milne et al. |
| 5,434,929 A | 7/1995 | Beernink et al. |
| 5,434,965 A | 7/1995 | Matheny et al. |
| 5,471,568 A | 11/1995 | Webb et al. |
| 5,559,942 A | 9/1996 | Gough et al. |
| 5,623,679 A | 4/1997 | Rivette et al. |
| 5,625,833 A | 4/1997 | Levine et al. |
| 5,630,125 A | 5/1997 | Zellweger |
| 5,632,022 A | 5/1997 | Warren et al. |
| 5,644,674 A | 7/1997 | Aihara et al. |
| 5,666,113 A | 9/1997 | Logan |
| 5,680,636 A | 10/1997 | Levine et al. |
| 5,682,439 A | 10/1997 | Beernink et al. |
| 5,687,331 A | 11/1997 | Volk et al. |
| 5,689,717 A | 11/1997 | Pritt |
| 5,717,860 A | 2/1998 | Graber et al. |
| 5,717,879 A | 2/1998 | Moran et al. |
| 5,719,595 A | 2/1998 | Hoddie et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnold |
| 5,760,773 A | 6/1998 | Berman et al. |
| 5,761,485 A | 6/1998 | Munyan |
| 5,761,683 A * | 6/1998 | Logan et al. ................ 715/513 |
| 5,784,058 A * | 7/1998 | LaStrange et al. ........... 715/738 |
| 5,786,814 A | 7/1998 | Moran et al. |
| 5,790,818 A | 8/1998 | Martin |
| 5,801,685 A | 9/1998 | Miller et al. |
| 5,801,687 A | 9/1998 | Peterson et al. |
| 5,802,516 A | 9/1998 | Shwarts et al. |
| 5,819,301 A | 10/1998 | Rowe et al. |
| 5,821,925 A | 10/1998 | Carey et al. |
| 5,822,720 A | 10/1998 | Bookman et al. |
| 5,826,025 A | 10/1998 | Gramlich |
| 5,832,263 A | 11/1998 | Hansen et al. |
| 5,835,092 A | 11/1998 | Boudreau et al. |
| 5,838,313 A | 11/1998 | Hou et al. |
| 5,838,914 A | 11/1998 | Carleton et al. |
| 5,845,262 A | 12/1998 | Nozue et al. |
| 5,854,630 A | 12/1998 | Nielsen |
| 5,860,074 A | 1/1999 | Rowe et al. |
| 5,862,395 A | 1/1999 | Bier |
| 5,893,126 A | 4/1999 | Drews et al. |
| 5,893,132 A | 4/1999 | Huffman et al. |
| 5,903,729 A * | 5/1999 | Reber et al. ................. 709/219 |
| 5,918,236 A | 6/1999 | Wical |
| 5,920,694 A | 7/1999 | Carleton et al. |
| 5,923,326 A | 7/1999 | Bittinger et al. |
| 5,924,104 A * | 7/1999 | Earl ........................ 715/501.1 |
| 5,931,912 A | 8/1999 | Wu et al. |
| 5,933,139 A | 8/1999 | Feigner et al. |
| 5,933,140 A | 8/1999 | Strahorn et al. |
| 5,937,416 A | 8/1999 | Menzel |
| 5,940,080 A | 8/1999 | Ruehle et al. |
| 5,948,040 A | 9/1999 | DeLorme et al. |
| 5,950,214 A | 9/1999 | Rivette et al. |
| 5,956,034 A | 9/1999 | Sachs et al. |
| 5,956,048 A | 9/1999 | Gaston |
| 5,978,818 A | 11/1999 | Lin |
| 5,982,370 A | 11/1999 | Kamper |
| 5,983,248 A | 11/1999 | DeRose et al. |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A * | 1/2000 | Bristor ....................... 715/840 |
| 6,018,344 A | 1/2000 | Harada et al. |
| 6,018,742 A | 1/2000 | Herbert, III |
| 6,025,841 A | 2/2000 | Finkelstein et al. |
| 6,034,689 A | 3/2000 | White et al. |
| 6,035,330 A | 3/2000 | Astiz et al. |
| 6,037,934 A | 3/2000 | Himmel et al. |
| 6,038,598 A * | 3/2000 | Danneels ..................... 709/219 |
| 6,049,812 A | 4/2000 | Bertram et al. |
| 6,052,514 A | 4/2000 | Gill et al. |
| 6,054,990 A | 4/2000 | Tran |
| 6,055,538 A | 4/2000 | Kessenich et al. |
| 6,064,384 A | 5/2000 | Ho |
| 6,072,490 A | 6/2000 | Bates et al. |
| 6,076,917 A | 6/2000 | Wen |
| 6,081,829 A | 6/2000 | Sidana |
| 6,091,930 A | 7/2000 | Mortimer et al. |
| 6,094,197 A | 7/2000 | Buxton et al. |
| 6,105,044 A | 8/2000 | DeRose et al. |
| 6,122,649 A * | 9/2000 | Kanerva et al. .............. 715/516 |
| 6,133,925 A * | 10/2000 | Jaremko et al. .............. 345/441 |
| 6,141,007 A | 10/2000 | Lebling et al. |
| 6,144,375 A | 11/2000 | Jain et al. |
| 6,144,991 A | 11/2000 | England |
| 6,151,622 A * | 11/2000 | Fraenkel et al. ............. 709/205 |
| 6,154,771 A | 11/2000 | Rangan et al. |
| 6,157,381 A | 12/2000 | Bates et al. |
| 6,163,778 A * | 12/2000 | Fogg et al. .................... 707/10 |
| 6,181,344 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,419 B1 | 3/2001 | Fielder |
| 6,205,455 B1 | 3/2001 | Umen et al. |
| 6,211,871 B1 | 4/2001 | Himmel et al. |
| 6,226,655 B1 * | 5/2001 | Borman et al. ........... 715/501.1 |
| 6,230,171 B1 | 5/2001 | Pacifici et al. |
| 6,243,071 B1 | 6/2001 | Shwarts et al. |
| 6,243,091 B1 | 6/2001 | Berstis |
| 6,266,772 B1 * | 7/2001 | Suzuki ....................... 713/182 |
| 6,272,484 B1 | 8/2001 | Martin et al. |
| 6,279,014 B1 | 8/2001 | Schilit et al. |
| 6,289,126 B1 | 9/2001 | Ishisaka |
| 6,289,362 B1 | 9/2001 | Van Der Meer |
| 6,301,590 B1 | 10/2001 | Siow et al. |
| 6,320,169 B1 | 11/2001 | Clothier |
| 6,320,577 B1 | 11/2001 | Alexander |
| 6,321,242 B1 * | 11/2001 | Fogg et al. ................... 715/513 |
| 6,321,244 B1 | 11/2001 | Liu et al. |
| 6,331,866 B1 | 12/2001 | Eisenberg |
| 6,331,867 B1 | 12/2001 | Eberhard et al. |
| 6,340,980 B1 | 1/2002 | Ho |
| 6,356,287 B1 | 3/2002 | Ruberry et al. |
| 6,369,811 B1 | 4/2002 | Graham et al. |
| 6,370,497 B1 * | 4/2002 | Knowles ........................ 704/1 |
| 6,377,983 B1 | 4/2002 | Cohen et al. |
| 6,389,434 B1 | 5/2002 | Rivette et al. |
| 6,393,422 B1 | 5/2002 | Wone |
| 6,397,264 B1 | 5/2002 | Stasnick et al. |
| 6,405,221 B1 | 6/2002 | Levine et al. |
| 6,418,421 B1 | 7/2002 | Hurtado et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,437,807 B1 | 8/2002 | Berquist et al. |
| 6,446,110 B1 | 9/2002 | Lection et al. |
| 6,457,013 B1 * | 9/2002 | Saxton et al. ................ 707/101 |
| 6,484,156 B1 * | 11/2002 | Gupta et al. .................... 707/1 |
| 6,486,895 B1 | 11/2002 | Robertson et al. |
| 6,490,603 B1 | 12/2002 | Keenan et al. |
| 6,529,920 B1 * | 3/2003 | Arons et al. ............... 715/500.1 |
| 6,535,294 B1 | 3/2003 | Arledge, Jr. et al. |
| 6,539,370 B1 | 3/2003 | Chang et al. |
| 6,549,220 B1 * | 4/2003 | Hsu et al. .................... 715/854 |
| 6,549,878 B1 | 4/2003 | Lowry et al. |
| 6,560,621 B2 | 5/2003 | Barile |

| | | | |
|---|---|---|---|
| 6,571,211 B1 | 5/2003 | Dwyer et al. | |
| 6,571,295 B1 | 5/2003 | Sidana | |
| 6,573,907 B1 | 6/2003 | Madrane | |
| 6,585,776 B1* | 7/2003 | Bates et al. | 715/501.1 |
| 6,636,238 B1 | 10/2003 | Amir et al. | |
| 6,647,534 B1 | 11/2003 | Graham | |
| 6,662,310 B2 | 12/2003 | Lopez et al. | |
| 6,681,045 B1* | 1/2004 | Lapstun et al. | 382/187 |
| 6,687,878 B1 | 2/2004 | Eintracht et al. | |
| 6,697,997 B1* | 2/2004 | Fujimura | 715/501.1 |
| 6,710,790 B1 | 3/2004 | Fagioli | |
| 6,714,214 B1 | 3/2004 | DeMello | |
| 6,760,884 B1 | 7/2004 | Vertelney et al. | |
| 6,766,494 B1* | 7/2004 | Price et al. | 715/513 |
| 6,772,139 B1* | 8/2004 | Smith, III | 707/3 |
| 6,788,316 B1* | 9/2004 | Ma et al. | 715/739 |
| 6,871,318 B1 | 3/2005 | Wynblatt et al. | |
| 6,976,035 B1* | 12/2005 | Lapstun et al. | 707/200 |
| 2001/0031128 A1 | 10/2001 | Manbeck | |
| 2002/0013834 A1* | 1/2002 | Esakov et al. | 709/223 |
| 2002/0097261 A1 | 7/2002 | Gottfurcht et al. | |
| 2002/0099552 A1 | 7/2002 | Rubin et al. | |
| 2002/0194260 A1 | 12/2002 | Headley et al. | |
| 2005/0060138 A1 | 3/2005 | Wang et al. | |

FOREIGN PATENT DOCUMENTS

| | | |
|---|---|---|
| EP | 0 822 501 A1 | 2/1998 |
| WO | WO 87/01481 | 3/1987 |
| WO | WO 96/20908 | 7/1996 |
| WO | WO 97 22109 A | 6/1997 |
| WO | WO 98/06054 | 2/1998 |
| WO | WO 98/09446 | 3/1998 |
| WO | WO 99/49383 | 9/1999 |

OTHER PUBLICATIONS

Schilit and Price: "Digital Library Information Appliances", ACM Conference on Digital Libraries, Jun. 23, 1992, pp. 217-226.
Graefe, et al: "Designing the muse: A Digital Music Stand for the Symphony Musician", Proc. of Conf on Human Factors In Computing Systems, Apr. 13-18, 1996, pp. 436-441.
Softbook® Press The Leader in Internet-Enabled Document Distribution and Reading Systems; http://www.softbook.com/consumer/reader.asp, 1999.
Rocket eBook Using the Rocket eBook; http://www.rocketbook.com/Products/Faq/using.html, 1999.
Explore the Features of the Rocket eBook; wysiwyg://212http://www.rocketbook.com/Products/Tour/index.html, 1999.
Crespo, Chang, Bier: Computer Networks and ISDN Systems "Responsive interaction for a large Web application: the meteor shower architecture in the WebWriter II Editor", 1997, pp. 1508-1517.
Hirotsu et al. "Cmew/U—A Multimedia Web Annotation Sharing System", NTT Network Innovation Laboratories- Japan, IEEE, 1999, pp. 356-359.
Kuo et al., "A Synchronization Scheme for Multimedia Annotation", Multimedia Information Networking Laboratory, Tamkang University- Taiwan, IEEE, 1997, pp. 594-598.
"Hucklefine Defined", Apr. 1990, "http://www.ylem.org/artists/mmosher/huck.html", pp. 1-3.
"Tour of Korea Hypercard Stack", 1996, Grose Educational Media, "http://www.entrenet.com/~groedmed/kor2.html", pp. 1-2.
Bizweb2000.com—screenshots of an e-book, published on May 1999, pp. 1-4 "http://web.archive.org/web/*/http://www.bizweb2000.com/eshots.htm".
"Adobe Acrobat 3.0 Reader Online Guide", Adobe Systems, Inc., pp. 1-110.
Kunikazu, T., Patent Abstracts of Japan, Publication No. 11327789 for Color Display and Electronic Blackboard System, published Nov. 30, 1999.
Open eBook Forum, Open eBook™ Publication Structure 1.0, http://www.ebxwg.org/oebps/oebps1.0/download/oeb1-oebps.htm.
Kristensen, A., "Formsheets and the XML Forms Language" (Mar. 1999).
Dublin Core Resource Types: Structurality DRAFT: Jul. 24, 1997, (Feb. 27, 1998).
Dublin Core Metadata Element Set, Version 1.1: Reference Description (1999).
Dublin Core Metadata Initiative: User Guide Working Draft Jul. 31, 1998 (1999).
Marshall, C., "Annotation from paper books to the digital library," ACM International Conf. on Digital Libraries, 1997, pp. 131-140.
"Joke eBook," Jul. 1998, PrimaSoft PC, Inc., Electronic Book Series Version 1.0, pp. 1-5.
Munyan, D., "Everybook, Inc: Developing the E-Book in Relation to Publishing Standards," Sep. 1998, http://www.futureprint.kent.edu/articles/munyan01.htm, pp. 1-7.
Greenberg, Saul, "A Fisheye Text Editor for Relaxed-WYSIWIS Groupware", Chi 1996 Proceedings, pp. 1 to 5.
C. Marshall, "Annotation from paper books to the digital library," ACM International Conf. on Digital Libraries, 1997, pp. 131-140.
D. Munyan, "Everybook, Inc: Developing the E-Book in Relation to Publishing Standards." Sep. 1998, http://www.futureprint.kent.edu/articles/munyan0.1htm, pp. 1-7.
PhotoImpact 3.0, Ulead Systems Inc., 1996.
Landay et al., "Making Sharing Pervasive: Ubiquitous Computing for Shared Note Taking," IBM Systems Journal, vol. 38, No. 4, 1999, pp. 531-550.
Landay, J. A., "Using Note-Taking Appliances for Student to Student Collaboration," 29th Annual Frontiers in Education Conference, IEEE Computer Society, Nov. 1999, p. Session 12C4/15-12C4/20.
Dublin Core Resource Types: Structurality Draft: Jul. 24, 1997, Feb. 27, 1998.
Dublin Core Metadata Element Set, Version 1.1: Reference Description 1999.
Dublin Core Metadata Initiative: User Guide Working Draft Jul. 31, 1998 1999.

* cited by examiner

COMPUTER USER INTERFACE ARCHITECTURE WHEREIN BOTH CONTENT AND USER INTERFACE ARE COMPOSED OF DOCUMENTS WITH LINKS

TECHNICAL FIELD

This invention relates generally to computer user interface architectures. More particularly, the invention provides a user interface architecture in which both user content and user interface are composed of document pages with links.

BACKGROUND OF THE INVENTION

Many personal computer users find the desktop metaphor of prior art computer user interfaces ("UIs") confusing and difficult to learn. Accordingly, there is a need for a system that simplifies the user's interaction with the computer by using fewer kinds of user interface controls in a more general way.

Further, the ways in which users interact with information about prior UIs is different than the way the user interacts with content, such as documents, presentations, and the like. For example, in prior art UIs, content and UI information are displayed entirely differently. Content is typically displayed in a particular region or frame of the display. User interface information is never displayed there. Instead, user interface information is displayed in dialog boxes, drop down menus, and tool bars. User content never shows up in dialog boxes, drop down menus, and tool bars. Similarly, users find user content documents and UI help information differently. Accordingly, there is a need for a UI architecture in which the concepts and actions the user must learn are the same for interacting with both content and the UI. Such a unification makes computer software easier and more efficient to use.

Prior art UIs for desktop computers typically require a keyboard and mouse in order for a user to interact with them, and most pen-enabled palmtop computers have cumbersome means of interaction. Therefore, there is a need for more "natural" styles of interacting with a computer by using a minimum number common gestures such as touch, hold, erase, draw or write.

Prior art UI desktop metaphors applied to small form factor devices are typically cluttered and difficult to use. In addition, applications that provide rich functionality are sometimes constrained by the limited ability of a user to navigate menus and dialogs of prior art UIs. For instance, for such applications, the menus and tool bars may get too big, and the help system may get too cumbersome to navigate or search. Accordingly, in addition to the need for a simpler more unified experience for the user of an application, there is also a need to facilitate the uncluttered presentation of user interfaces for applications providing very rich functionality.

Usability data for prior art UIs show that users of multi-windowed systems don't always know which actions will produce results in which window. Therefore, there is a need to reduce the complexity and confusion sometimes caused by multi-windowed user interfaces.

Prior art UIs typically offer limited capabilities for customizing the UI. Accordingly, there is a need for a UI architecture that provides greater flexibility to users, content developers, and third-party software developers by providing broader capabilities for easily customizing the UI. For example, different groups of users may be of different levels of computer skill and have need of different sets of features, and the UI can be customized to better suit their needs.

Users of prior art UIs sometimes become extremely frustrated when their work is lost because their work was not properly saved. Accordingly, there is a need to provide a save-less model, so that users do not need to explicitly save their work.

Users of prior art UIs typically do not have a convenient and seamless way to record notes verbally and to associate notes with particular parts of a document. Accordingly, there is a need to provide rich support for audio note taking with the ability to correlate and synchronize audio and textual material and to review and retrieve audio notes.

Prior art device-to-device and device-to-PC synchronization schemes typically are not seamless and require a great deal of configuration and attention from the user. Accordingly, there is a need to provide automatic and transparent synchronization between a user's computers, such as a handheld computer and a desktop computer.

In prior art UIs, methods for getting help are currently separate from the content and often require completely different interactions than interacting with content. Accordingly, there is a need to make the process of getting help about a function the same as the process for carrying out the function.

Prior art UIs typically have a "single-user model" at the heart of their interface metaphors, which makes sharing content and annotations with other users difficult and non-intuitive. Accordingly, there is a need to make sharing and collaborating on documents easier and more automatic.

SUMMARY OF THE INVENTION

According to various preferred embodiments, the invention includes a user interface architecture in which user content and user interface are composed of documents with links. A link can relate a spot or region in a document with a spot or region in another document, so that touching the link causes the display to navigate to that other document. A link can also relate a spot or region in a document and an active runable object such that when a user activates that link or touches that spot in the document, the associated object is run. Parameters for the execution of the object may be supplied by properties associated with the link. Links, therefore, can act as commands. Links may be to any kind of command code.

A link may manifest in various ways based on the link's properties. Links can look like not only clickable spots, but also fill-in fields and other kinds of well-known and later-developed user interface elements. Alternatively, links can manifest in the containing document a frame displaying the contents of part, or all, of the linked-to document. When links are displayed, in addition to basing the display format of the link on the link's display properties, the link display format may depend upon the characteristics of the linked-to document.

The path a user takes to reach a document typically affects the behavior and presentation of the document. State-like information for displaying a linked-to document page is stored separately from the linked-from and linked-to documents as part of the link's properties. Users access, interact with, and navigate among both user content documents and user interface documents in a unified way, namely, by activating links. Further, both user content document pages and user interface document pages are displayed in a single viewing frame. This unified approach simplifies the user's interaction with both user content and user interface documents by reducing the number of concepts a user must learn in order to access, interact with, and modify both user content documents and the user interface.

A non-linear navigation history is maintained such that a user can navigate along a first path, back up using a previous link an appropriate number of times, navigate along a second path, back up along the second path using the previous link an appropriate number of times, and re-navigate along the first path again using a next link. Every document page to which a user navigates is saved in the user's navigation history. Users can query their navigation histories and view their navigation history in various ways, such as: by time, by appearance, by site, document, section, page, and the like. User can also view their navigation history as nodes with side tracking branches, as a linear list, or as a combination of most recently viewed pages and last few task categories. According to a preferred embodiment, navigation from user content pages through user interface pages that results in a command being executed is automatically removed from the user's view of the navigational history in order to keep the navigational history view uncluttered.

A flexible selection model is supported allowing users to select the object of a command either before or after the command itself is selected. This flexible selection model allows UIs built according to the principles of this invention to scale to small display areas. UIs built according to the principles of this invention also scale well to applications having voluminous and/or complicated user interfaces by facilitating an organized and uncluttered view of the user interface command hierarchy and/or user interface help information for such applications.

Users get at commands by navigating to a page where the desired command is found. In a preferred embodiment, the documents-with-links UI according to the principles of this invention is organized to make frequently used commands a single navigation step away, or through customizations, no steps away. A self-explanatory document, the Guide Book is provided. The Guide Book is a readable manual that users can go through in a logical order, a page at a time, like any conventional user manual. Each command mention, however, is an active command instance that can be invoked in place.

Other features and advantages of the invention will become apparent through the following description, the figures, and the appended claims.

BRIEF DESCRIPTION OF THE DRAWINGS

FIG. 7 depicts example Guide Book pages displayed on a personal viewer according to a preferred embodiment of the invention.

FIG. 10 depicts an example of inked annotation displayed on a personal viewer according to a preferred embodiment of the invention.

DETAILED DESCRIPTION OF THE INVENTION

Introduction

Clutter-Free and Simple

Figure 1:
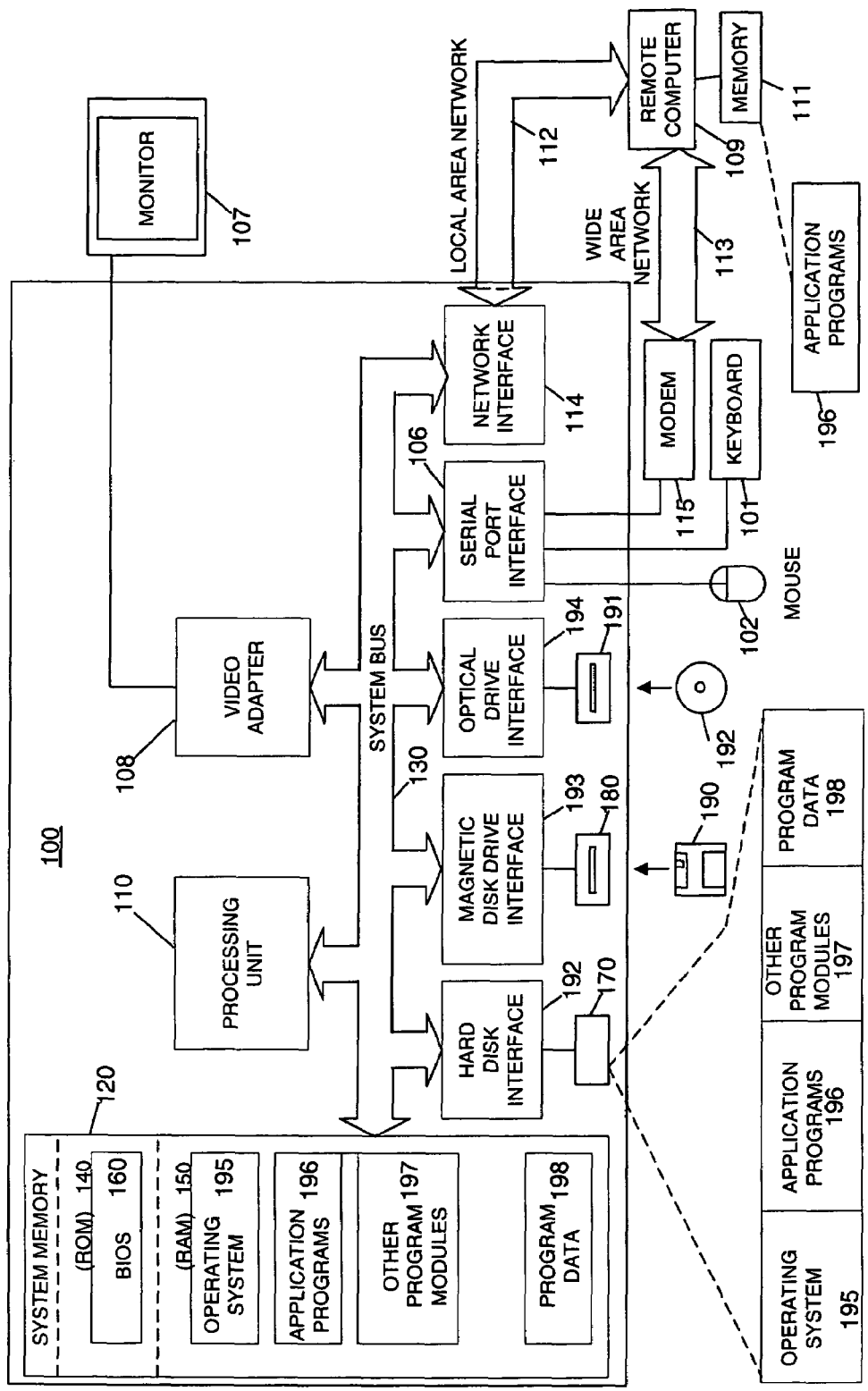
FIG. 1 is a schematic diagram of a conventional general-purpose digital computing environment that can be used to implement various aspects of the invention.

The UI architecture of this invention, also referred to herein as a "documents-with-links UI," supports creation of UI's that have essentially zero clutter, and few concepts to master. In this way, it is a major departure from prior art UI's using a desktop metaphor. The user of a documents-with-links UI according to this invention focuses primarily on content and not on UI appurtenances. Starting with just knowledge of how to page through a document and to follow links, a user can learn how to do any other UI operation. Significantly, the documents-with-links UI works without drop-down menus, toolbars, windows, or other cluttering UI elements (although some of these elements may optionally be made available where they are desired)

Content and UI are Unified

In the UI architecture of this invention there is essentially no distinction between UI pages and content pages. "UI" and "content" are the same thing, and exist in the same navigation space. As described in more detail below, smart next/previous logic and intelligent management of the navigation chain solve technical problems caused by treating "UI" and content as the same thing in a unified navigational context.

Because there is no seam between UI and content, no notion of "dual" spaces, the documents-with-links UI is conceptually simpler for the user than a model that has separate UI and content webs. The one-space model is also more powerful and customizable, as described in more detail below.

Shortcuts

Numerous UI shortcuts and direct manipulations may exist as a configurable layer on top of the documents-with-links UI, so more experienced users can do the most common operations in context, without navigating to UI pages. The user gets the best of terse command access plus the richness of the full browser and answer system for exploring the command set.

The documents-with-links UI uses a web architecture, with UI shortcuts layered on top. A naïve user will typically start by using the documents-with-links UI without the shortcuts—that is, by using the Guide Book to access UI functions. An advanced user will typically be able to perform all common operations via the shortcuts and without resorting to the documents-with-links UI Guide Book as often.

Scalability to Various Display Sizes and Types

Various preferred embodiments of the documents-with-links UI will be explained below in the context of a portable "personal viewer" platform. Nevertheless, the documents-with-links UI is scalable across a wide range of device and display types from desktop computers to laptops to hand-held devices. Accordingly, the documents-with-links UI is intended to be implemented on any type of computing platform. The documents-with-links UI exploits a large screen by being able to show content in a book-like way—two full side-by-side pages, as depicted, for instance, in FIG. 8. UI, being content, takes advantage of the large format of pages and the ability to turn/navigate pages (versus the smaller size of menus/dialog boxes in prior art UIs and their limited or nonexistent provisions for navigation).

At the other end of the spectrum, the UI scales to small screens because of the flexible selection model that allows command selection regions to be initiated either before or after the desired command is chosen. This means, for example, that on a small screen a user can call up a page of command choices that completely obscure the original document due to screen size limitations, choose the command, then return to the user document and then select the region for the command to operate on. Suppose a user wanted to reformat some text, but had not selected the text to be reformatted yet. The user could press a link that indicates that it will reformat text. The UI of this invention will display an indicator on the screen prompting the user to select the text to be reformatted. After selecting the text, the user can finish the reformatting operation by clicking on another link, such as a link that indicates that the selected text will be reformatted. Alternatively, the user could select the region first and then go find and invoke the command. Being able to select the object upon which a command will operate after selecting the command is unlike the selection model of prior art U's where object selection must precede command selection. The selection model of the documents-with-links UI is discussed in more detail below.

General Concepts Underlying the Documents-With-Links UI Architecture

No Distinction Between Content Documents and UI Documents

The basic principle of the documents-with-links UI is that everything the user sees and interacts with is a document. This applies equally to both content and UI. These documents could be implemented in HTML, XML, and the like. There is essentially no difference between content and UI documents. In fact the same document can mix content and UI. Even though some UI elements like context menus and toolbars may be presented in ways that do not look document-like, they are in fact implemented as documents and can be manipulated as such.

The uniform treatment of content and "UI" pages is important for several reasons:

Users only need to deal with one set of navigation controls and conventions, and only one navigation space. Users never need to think about whether they are in content space or UI space.

Users can use the full power of the UI to manipulate the UI itself. For example, users can search, annotate, customize and edit UI pages the same as any content (subject to permissions). Users can select from multiple views for the page being viewed.

The model naturally accommodates dynamic content, including downloaded content, that mixes content and UI on the same page or as part of a network of related pages.

Links as Commands and Link Properties

A link can be an association between two different spots in a collection of document pages. The spots could be two spots on the same page. The spots could be a spot on one page and a spot on another page. Links can have properties that indicate certain things about the link beyond simply the fact that it relates two different places. What a link relates need not necessarily always be displayable pages. A link can relate a spot in a document and an active runable object such that when a user activates that link or touches that spot in the document, the associated object is run. Links, therefore, can act as commands. Links may be to any kind of command code. Scripts are one example. Binary code objects are another example. As a result, pages that have links replace the drop-down menus and dialog boxes of prior art UIs.

A link may manifest in various ways based on the link's properties. Links can look like not only clickable spots, but also fill-in fields and other kinds of well-known and later-developed user interface elements. A document page could have these other kinds of active elements that are really a form of link. Accordingly, activating links goes beyond merely clicking on colored underlined text and can include filling in fields, pressing radio buttons, and the like. Again, pages with links replace prior art dialog boxes having buttons and the like. The links may look like buttons, but the links are simply links.

Even the desktop metaphor of files and folders is expressed as lists of links on a page. Additionally, links have properties that govern their appearance and behavior. For example, a link's properties may dictate that it appear as a blue underscored text string as in prior art browsers, or as a 3D button, as a graphic icon, as a thumbnail image of the content being linked to, or even as an embedded frame that is open on the content being linked to.

As described in more detail below, a user can modify how a link manifests by modifying the link's properties. The ability to control a link's appearance and behavioral properties makes possible rich authoring and customization of both content and the user interface.

Actions in a UI according to the principles of this invention occur by clicking on commands that exist on pages. To the user, a command looks like a link, and in fact it is a link. Specifically, a command is a link whose source anchor is the command hotspot, whose destination anchor is the script or code that implements the command, and whose properties are the command parameters. Some commands may run with canned parameters while others may present users with a form for entering the parameters (for example, the Properties command).

Because a command is a link, it has all the functionality of links. For example, commands can visualize in multiple ways, such as an underlined blue label, a button, an icon, or a graphic image. They can be copied from one place to another, moved, and deleted. Their properties can be manipulated, such as to change their appearance or to preset some or all of their parameters. Commands can also be created the same way that any kind of link is created, via a Link command, which establishes a link between a source and destination that the user specifies; in the case of creating a command link, the destination is an executable object such as a command script or binary. Everything users can do to a link, or to objects in general (since a link is an object), users can do to commands.

Guide Book

Users get at commands by navigating to a page where the desired command is found. The documents-with-links UI is organized to make frequently used commands a single navigation step away, or through customizations, no steps away. Less commonly used commands may take more steps to get to.

The documents-with-links UI includes a self-explanatory document, the Guide Book. This is literally a readable manual that users can go through in a logical order, a page at a time, like any current user manual. The difference is that each command mention is an active command instance that can be invoked in place. A variety of Quick Help pages and indices make it easy to get quick access to sets of commands that are commonly used together, that are logically related, or that are typically used as part of a given scenario. Such Quick Help pages could be assembled dynamically based upon the context of the document or documents being viewed by the user.

Users can also use search to find commands. This could call into play an intelligent user assistant or other conventional help mechanisms when appropriate.

Even if all commands were only one navigational hop away, however, the documents-with-links UI would not be ideal, because users want the most common commands to be zero hops away. Users also want context sensitivity to command presentation, like that provided by conventional context menus. The documents-with-links UI therefore accommodates things like toolbars, context menus, and other UI shortcuts that the user can customize. Like everything else in the documents-with-links UI, shortcuts are implemented as documents with links. The UI shortcuts can be conceptualized as being layered on top of the base documents-with-links UI, yet shortcuts are actually constructed out of the same components that comprise the documents-with-links UI: documents with links.

As a user looks up commands from the Guide Book, the user will learn short cuts so that the more a user interacts with the UI, the less often the user will typically need to navigate to the Guide Book. Therefore, shortcuts will be discussed below, with reference to a preferred embodiment of this UI architecture implemented on a personal viewer, as the shortcuts would appear to a user, because, eventually, shortcuts are what most users would use in their day-to-day activities with the documents-with-links UI.

Rich Navigation and Maintaining the User's Navigational History

When a user performs a navigation action, a record is created of where the user navigated to and at what date and time this occurred. It is thus possible to query this set of records to derive many views of a user's navigational history, including, for instance, a network view, also referred to as a history map view. Ways in which a user's navigational history may be viewed are discussed in more detail below in the Viewing History section.

The history map view is a generalization of the linear history provided by prior art browsers. The history map view makes it easy for a user to revisit a place the user visited previously, with important cues about the context in terms of other places the user was visiting at the time. The Next command works with the branching history too. A user can explore a chain of links, back up, explore a different chain, back up, and Next the user's way down the original chain to get back to where the user was. This is much easier than having to manually re-follow the original chain of links, which would be impossible if the user has forgotten the chain of links they had previously followed This is an important extension of the prior art browsing metaphor. Unlike prior art browser UIs with their linear navigation chain, the documents-with-links UI doesn't forget all the twists and turns of where the user has been just because the user backs up and proceeds in a different direction. The documents-with-links UI stores not only where the user has been, but also the path(s) the user took to get there. The user can use the history map and/or the Next/Previous commands to get back there again.

The Next function works in this network-style navigational context by using heuristics to pick which path forward the user most likely intends. The most basic rule is to pick the forward path along which the user backed to the current node. Other rules provide additional intelligence to account for a user's known navigational patterns, such as whether the user got to the current node by navigating back by individual pages or by groupings of pages (such as by site), or by linking from a parent to a child. The Next function could include options to present a user with a list of forward choices, textually and/or as a map in which the user could zoom into desired areas. In this way, the user can control which branch to take, if the user is not satisfied with the documents-with-links UI's selection.

Part of what makes the navigation and context trimming heuristics possible is built-in knowledge of logical levels of information grouping. For example, the documents-with-links UI can include knowledge of collections of pages making up sections and chapters, of collections of sections and chapters making up a document, of collections of documents making up web sites, and so on. The same is true for the layers of command finding and invocation. Such knowledge of semantic clustering helps guide decisions about popping contexts and for presenting the user with reasonable choices about points to jump to along the Next/Previous chain.

A problem with treating content and UI as part of the same navigation space is that the user's navigation chain gets cluttered with UI-related pages. The documents-with-links UI solves that through intelligent management of the navigation context, and by making that context a true network, not just a linear chain.

Specifically, when a user navigates from one place to another, a new branch in the navigation chain is started. So, if a user's context is currently B in the existing chain of document pages A-B-C, and the user navigates to D, then the new context is D. D might be a UI page the user navigated to from document B. When the user clicks a command on page D, the command executes and removes D from the navigation context. Thus, after finding and executing the command, the user's navigation context is restored to document page B.

To find a needed command the user might have to navigate along a chain from D to several other pages in the Guide Book, resulting in a chain of several steps branching off from B. When the user finally picks a command, the documents-with-links UI knows what to act on, and what to remove from the navigation context as follows. Commands operate on the current selection, and, in general, remove the navigation nodes that lie on the branch leading from the current selection to the command. Further, additional heuristics may be used for unusual cases.

Current selections in the documents-with-links UI are similar to current selections in prior art desktop UIs, but there are differences because the documents-with-links UI deals with a network of active documents that are different than a desktop of active windows. The two schemes are similar in that every document can have a single, possibly disjoint, selected area. The schemes differ in that the documents-with-links UI can't use the idea of the current focus to decide what selection a command should operate on. In prior art desktop UI's, the document the user wants to operate on typically has the current focus, and all UI elements implicitly reference this focus. In the documents-with-links UI world, the user may have navigated several hops away from the document the user wants to operate on, as the user looked for the desired command, so, in the documents-with-links UI, focus doesn't disambiguate anything.

Therefore, in accordance with a preferred embodiment, instead of the current selection being the one whose document has the focus, the current selection is the most recently selected area. All commands that are configured to operate on selections will operate on that most recently selected area. Having executed, they will trim the navigation context at the branch point that leads from the current selection to the command itself.

The benefit is that users are free to link into the web of UI pages, exploring them as necessary to find the desired command, and then to invoke it. The act of doing so will end up trimming all the UI navigation from the context, leaving the user back where the user was before navigating to UI pages. Note that depending on the length and content of the navigational path between the command and recent selection, the UI may show the user the target and prompt the user to confirm before proceeding.

Note that if no selection exists when a command is executed, then the next selection the user establishes will be considered to be the most recent selection for purposes of determining the command target. In this case, after the user makes the selection, command buttons will be presented in context with the selection by which the user can confirm or cancel execution of the previously selected command. Of course, other suitable methods of determining what selection to operate on are also possible. For instance, one such method is to allow only a single selection to be extant at a time. That is, any time a new selection is initiated, any prior selection is cancelled (un-selected). Another method is to choose what selection to operate on by doing a backwards scan in time order through the navigation context until an active selection is found. In most cases envisioned by the inventors, this latter solution produces the same result as the first one discussed; i.e., the most recent selection will be found.

The effect of the algorithm for trimming the navigational context is typically to isolate and remove the branch whose purpose was to find the command that was just executed. Trimming the navigational context of navigation to UI pages does not always occur, however. For example, an Apply command for property setting could leave the property form active and not trim the navigation context. Of course, different commands may choose to operate on the navigation context in different ways. Nevertheless, a couple standard ways will typically cover most of the cases.

Flexible Selection Model

The documents-with-links UI does not require users to make a selection before invoking a command. Users are free to select first and then click a command, or click the command first and then make a selection. If an appropriate selection does not exist when a command is invoked, the user is prompted to make a selection at that time. The selection mechanism and command verbs are designed to give users a lot of latitude about the order in which they do things when carrying out commands. Besides fitting better to users' personal habits, this makes it harder for users to do something "wrong," such as inadvertently applying formatting to text other than the text the user wants to reformat.

Page Display Depends Upon the Link Used to Navigate to the Page

The documents-with-links UI may display the same page of a document differently depending upon which link navigated a user to the page. Suppose the user wants to fill in the TO: field of an e-mail message. In this situation, the user wants to open the address book and make possibly several choices. To accomplish this within the document/navigation metaphor, forms could have special-purpose chooser controls where this provides a good shortcut for the most common choices. But the chooser UI should also make it possible to leverage the full power of the navigation, browsing, viewing, and search UI that is available in list-oriented documents like file folders and the address book. Making a choice from such a list should be a matter of just navigating to that list as a user would in any other context and making the choice.

For the address book example, the documents-with-links UI provides a link to the address book that is associated with the input field. The documents-with-links UI makes the link from an input field to its choice document, the address book in this example, be a command with navigation behavior, as opposed to being an ordinary link. This command navigates the user to the document the user needs to choose from and captures anything the user selects. After selecting the addresses the user wants, the user can simply navigate back to the send form where the TO: field is. Alternatively, the user could close the address book or use an OK command, either of which would return the user automatically. There is nothing to save, because all choice state is captured as the user proceeds. If there is a change in plan, the user could simply cancel the current selection, or clear the TO: field when the user returns.

If the user later wants to change the TO: field choices, the user may click the TO: field link again, and the user is taken back to the address book, with all the current choices still highlighted. The current choices are highlighted because the command that takes the user to the address book picks up the TO: state and paints the required selection regions.

To facilitate making selections in scenarios like this address book example, an additional facility is provided. The command which presents the document to choose from can also cause checkboxes to appear next to each entry in the document. Rather than manually selecting items in the document, the user can check or uncheck the checkboxes. This causes the associated entry to be selected or unselected, respectively.

In this address book example, the user is accessing a standard document, the address book, and the normal multiple selection idiom to make and change the user's TO: field fill-in choices. The user has the full power of the normal UI for navigating, viewing, and searching, the address book and can navigate to other documents containing addresses where the user can make other choices. Note that because the selection state is associated with the path the user took to reach the address book, the user will see the TO: items highlighted in the address book only if the user links to the address book (or successor nodes) via the TO: field in question. Thus, the existence of an active To: field does not interfere with other uses of the address book or with other active To: fields.

This is a significant principle of the documents-with-links UI: the path a user takes to reach a document typically affects the behavior and presentation of the document. This is a way to achieve state-like behavior without requiring special modes or UI mechanisms like dialogs. The implementation of chooser fields is one of the more important uses of this concept.

Modeless UI

Unlike prior art UI's the documents-with-links UI is essentially modeless. For example, a user could be involved in filling out a form for carrying out a UI operation such as creating a formatting style for a table. In the middle of doing this the user could navigate away from this UI form and get engaged in some other UI operation, such as filling out another form for a different purpose, and then, at any time, navigate back to the original, incomplete form. There is no restriction on the number of such incomplete operations that can be in progress simultaneously. Nor is there any limitation on switching away from such incomplete operations. This is unlike the prior art, where complex operations, typically performed via dialogs, must generally be complete or cancelled before the user switches to another activity. Unlike prior UI's, the user of a documents-with-links UI is typically not restricted from interrupting one operation to initiate another, or several others, nor would such an interruption cause the user to lose work already performed in partially completing the first operation.

Creating and Saving Information

Another architectural topic central to the documents-with-links UI is the model for creating and saving information. Any time a user creates something new, the user is creating a new document and linking it into a context. For an object inserted into an existing document, such as an embedded annotation, the user is linking it into the document that is to contain it, with link properties implicitly set to make the object visualize in place (OLE-style embedding). Physically, the object is stored as a child within the parent document's container.

For new, standalone objects, like a new word processing document, the object is instead added to the current navigation context, as if the user had done a Next to it from wherever the user was when the user issued the New command. Physically, the object may be stored in the user's sea of "free space" in a hidden system folder, not part of any folder the user is aware of, unless and until the user chooses to file it somewhere.

The user does not need to put documents into a filing hierarchy or save them. This is because the documents-with-links UI stores all navigational history. Accordingly, users can find the documents they create by viewing or searching their history map. A user could file a document into a folder as an optional step, using a Save As command or by manually creating a link in the folder that leads to the document (the Save As command could be simply a shortcut for creating such a link). Also, the user could use Save/Save As to update or create versions of a document in the filing hierarchy as desired.

Example Hardware Platforms for Implementing Aspects of the Invention

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are example and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
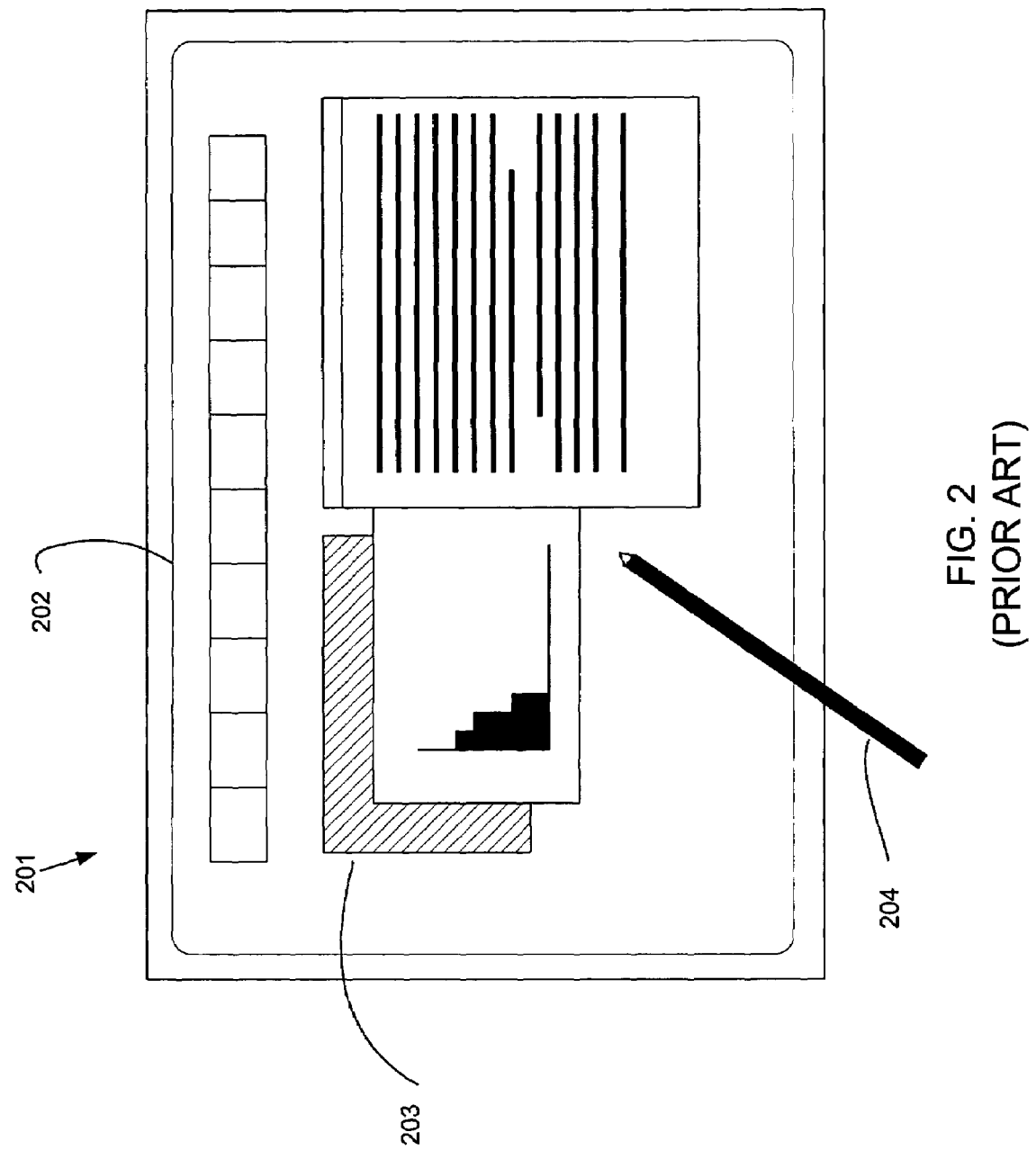
FIG. 2 shows a conventional tablet and stylus-based computer that can be used to implement various aspects of the invention.

FIG. 2 shows a tablet and stylus computer that can be used in accordance with various aspects of the present invention. Any or all of the features, subsystems, and functions in the system of FIG. 1 can be included in the computer of FIG. 2. Computer 201 includes a large display surface 202 (e.g., a flat panel display) on which a plurality of windows 203 is displayed. Using stylus 204, a user can select, highlight, and write on the display area. Computer 201 interprets marks made using stylus 204 in order to manipulate data, enter text, and execute conventional computer application tasks such as spreadsheets, word processing programs, and the like. One commercially available tablet and stylus computer incorporating many of these features is the Stylistic 2300 computer sold by Fujitsu Personal Systems, Inc., of Santa Clara, Calif.

A stylus could be equipped with buttons or other features to augment its selection capabilities. In one embodiment, a stylus could be implemented as a "pencil" or "pen" in which one end constitutes a writing portion and the other end constitutes an "eraser" end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Consequently, the term "user input device" is intended to have a broad definition and encompasses many variations on well-known input devices.

Example Steps for Implementing Aspects of the Invention

Figure 3:
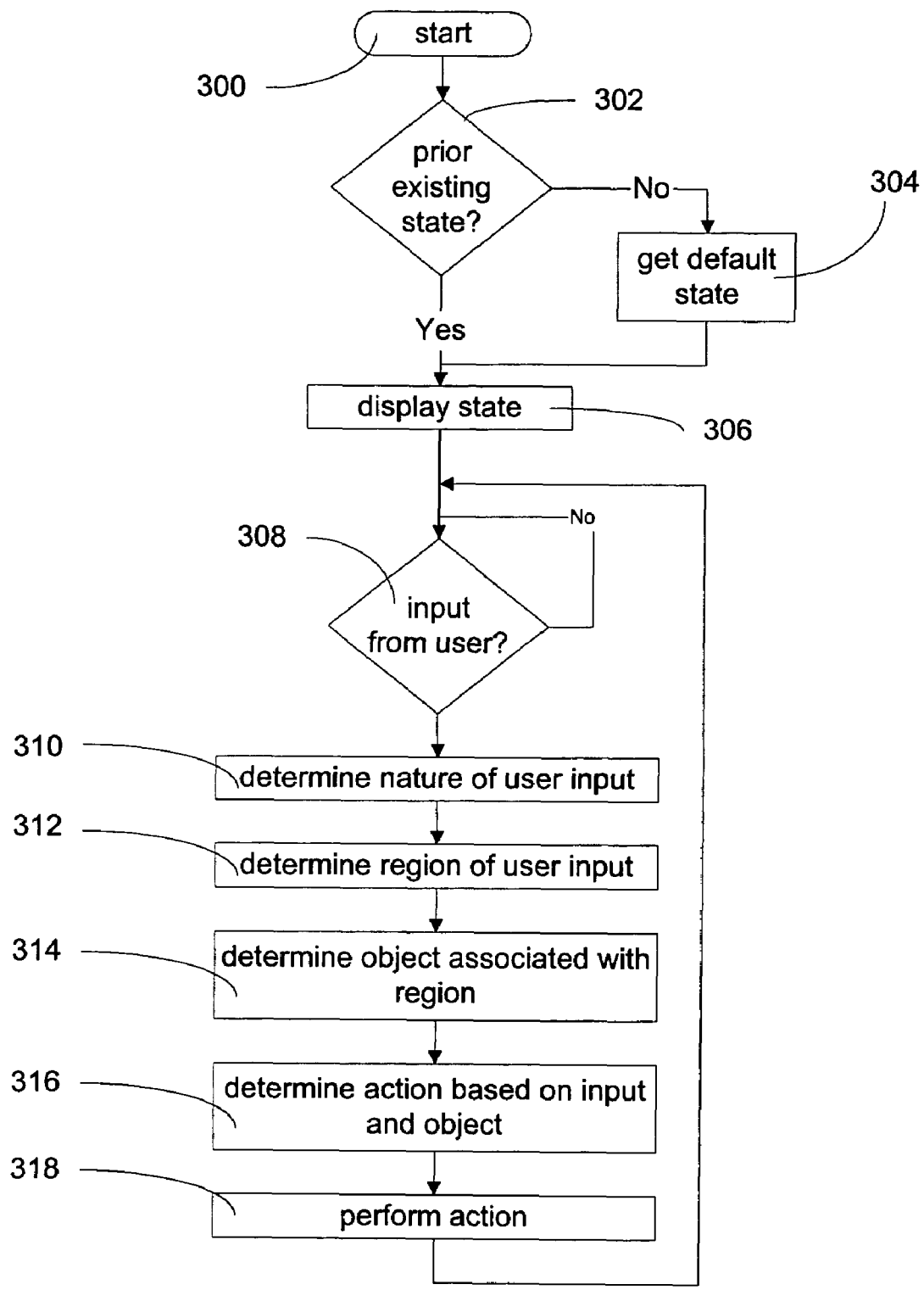
FIG. 3 is a flowchart showing simplified steps at a high level of abstraction for implementing a UI architecture according to the principles of this invention upon start up.

FIG. 3 is a flowchart showing simplified steps at a high level of abstraction for implementing a UI architecture according to the principles of this invention upon start up. Processing begins at start block 300. In step 302, the system checks to see whether there is a prior existing state. If there is a prior existing state, then that state is used as the current state. If there is no prior existing state, then in step 304 the system retrieves a previously stored default prior state and assigns the value of that default state, which could be, for instance, a default start page, to the current state. In a preferred embodiment, like other content and UI, the current state is stored as a document that contains links.

In step 308, the system waits for input from a user. Upon user input, the system determines the nature of the user input in step 310. Gestures for performing UI actions are discussed below. The nature of the user input could include a combination of the input device, such as a pen, and the gesture performed by the user. The system then determines the region of the user input in step 312, and, based upon the region of the user input, determines an object associated with the region in step 314. The system then determines an action to be performed based upon both the nature of the user input and the object associated with the region of the input in step 316. The system then performs the action in step 318. The system then loops back to step 308 to wait for more user input.

Figure 4:
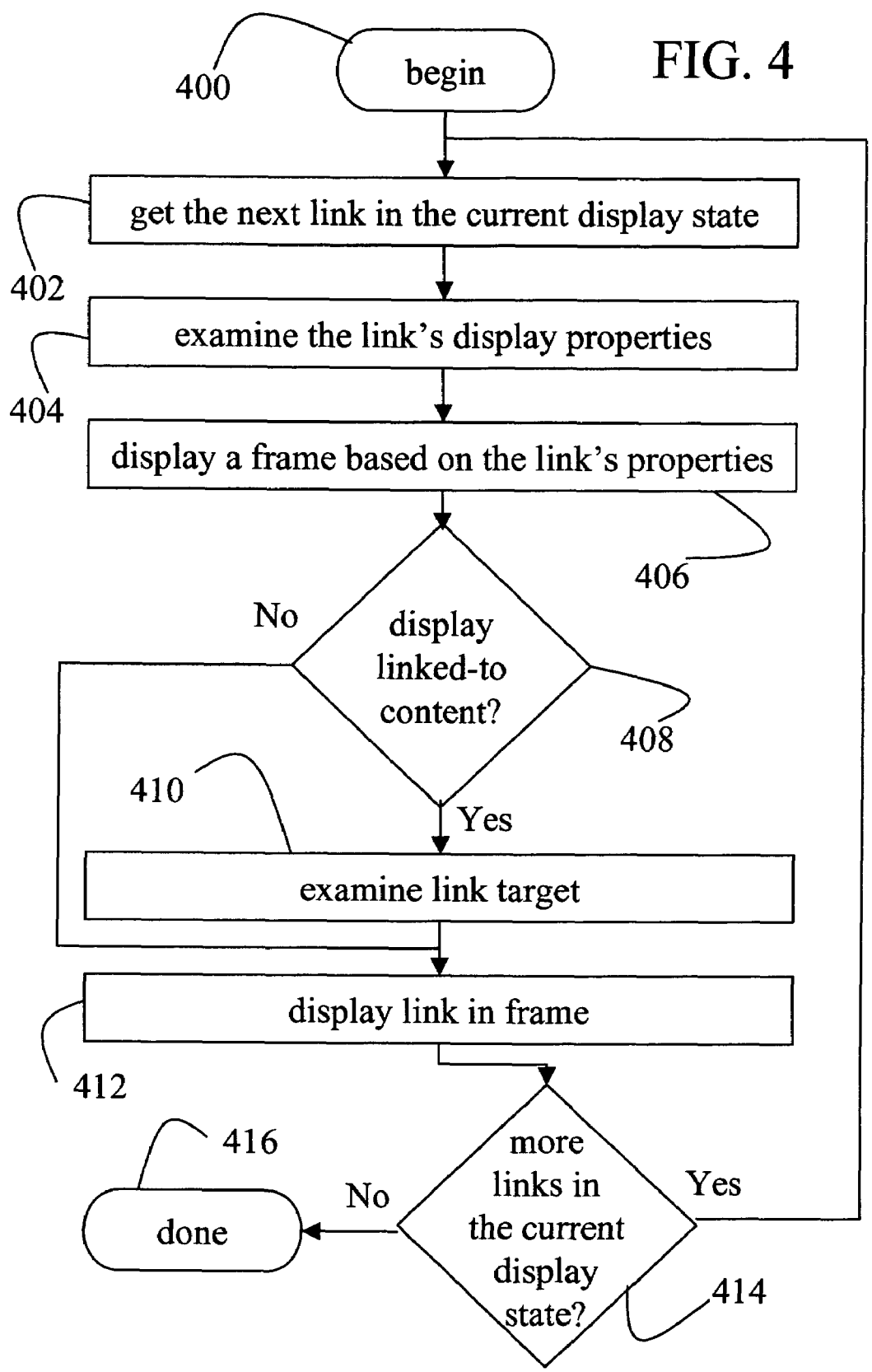
FIG. 4 is a flow chart showing simplified steps for implementing the "display state" step of the flow chart in FIG. 3.

FIG. 4 is a flow chart showing simplified steps for implementing the "display state" step, step 306, in FIG. 3. Referring to FIG. 4, processing begins at block 400. In step 402, the system retrieves a link from the previously saved display state, which may include a list of active or visible links. The retrieved link's display properties are examined in step 404. In step 406, a frame is then displayed based on the link's properties. In step 408, a check is performed to see whether, based upon the link's properties, linked-to content or other information about the linked-to document is to be displayed in the link's display frame. If such content or information is to be displayed, then the link's target is examined, as depicted in step 410. Otherwise, there is typically no need to examine the link's target. Then, in step 412, the link (with or without content or information or both from the linked-to document) is displayed in the display frame. Steps 402-412 are repeated until the check for more links in the current display state fails in step 414. Display state processing then ends in step 416.

Preferred Embodiments of the UI Architecture for a Personal Viewer

Various preferred embodiments of the documents-with-links UI of this invention are described herein as implemented on a personal viewer (hereinafter the term "PV" refers to a personal viewer upon which various aspects of preferred embodiments of a documents-with-links UI according to the principles of this invention are implemented).

Personal Viewer UI Elements

Figure 5:
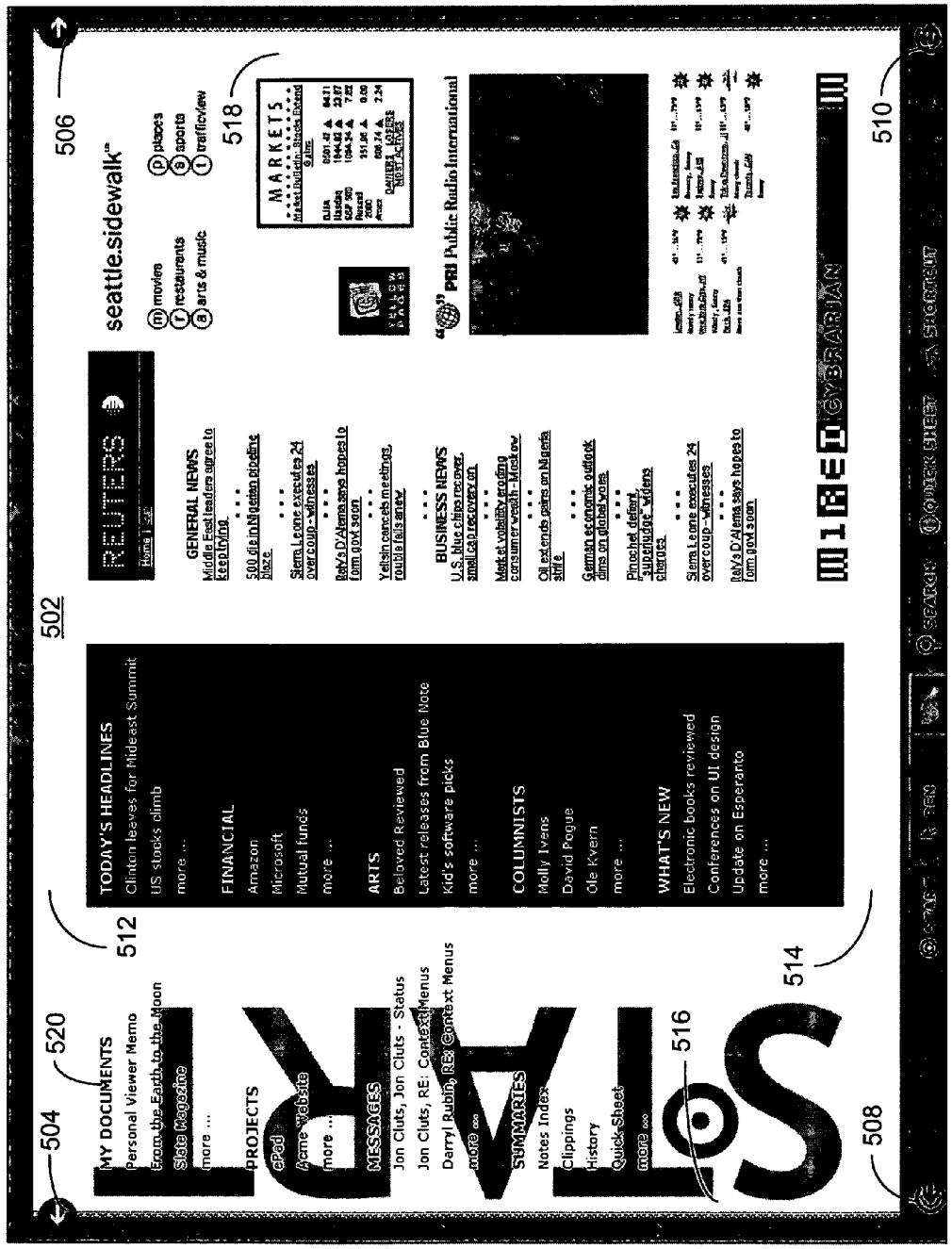
FIG. 5 depicts an example Start Page displayed on a personal viewer according to a preferred embodiment of the invention.

Referring now to FIG. 5, an example Start Page is displayed on a PV UI 500 that includes the following elements:

The display surface 502. This is touch sensitive for both fingertip and pen operations. The touch zones at the four corners 504, 506, 508, and 510 are used to initiate navigation operations such as turning pages and traversing the user's navigational history chain. Labels may be applied to these areas to cue completely naïve users how to turn pages the first time they interact with a PV UI.

The display margins. Documents that present on a PV UI typically show as print-like pages, including margins. The margin space is available for jotting notes and displaying UI-generated features like bookmark tabs and UI shortcuts. A default margin arrangement could be Top margin 512: bookmark tabs. Bookmarks or other objects placed here are associated with the containing document.

Bottom margin 514: document and command shortcuts and toolbar tabs. Document shortcuts or other objects placed here are associated with the display surface.

Left margin of leftmost display 516: clippings tabs Clippings or other objects placed here are associated with the containing page.

Right margin of rightmost display 518: clipping tabs. Clippings or other objects placed here are associated with the containing page.

Figure 6:
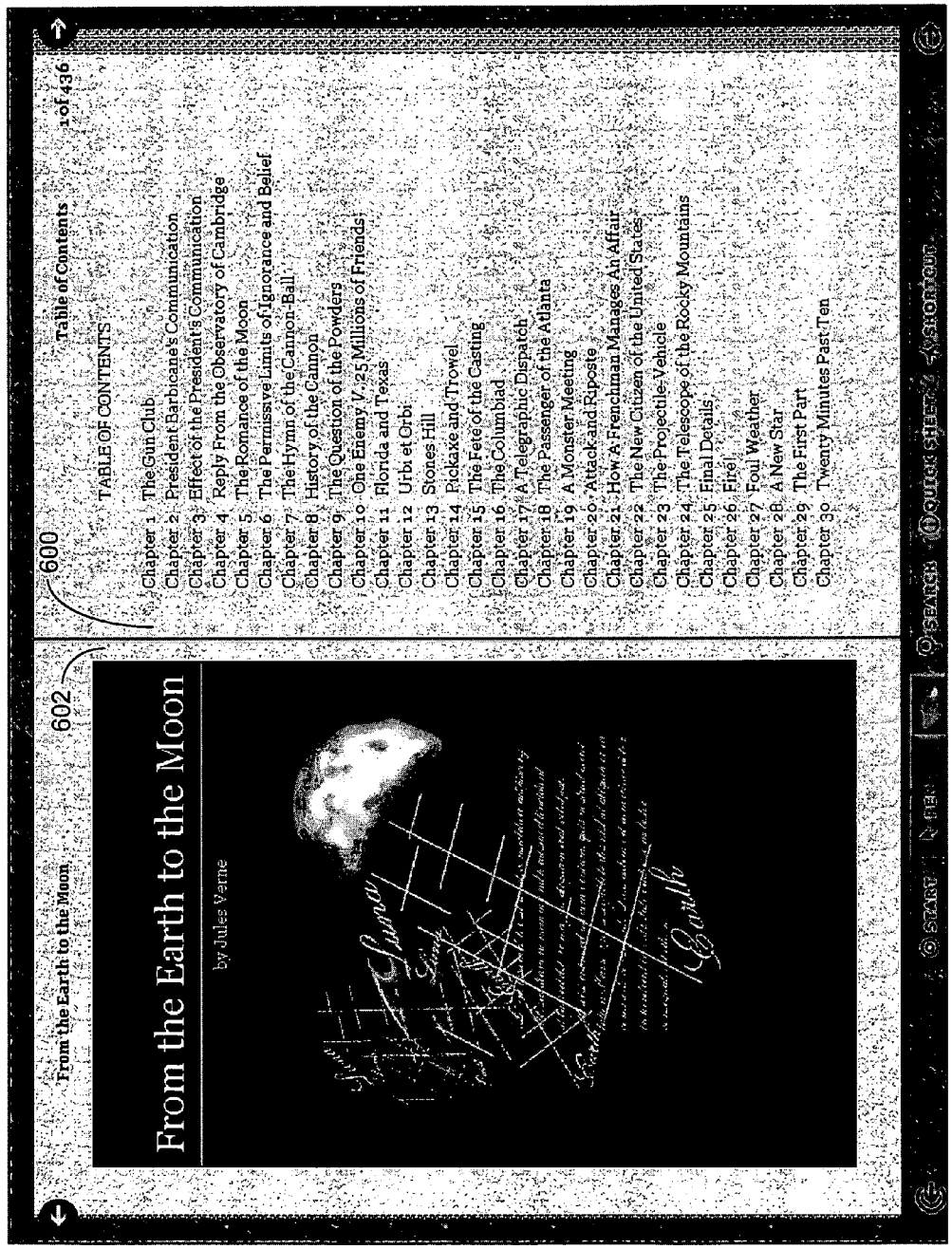
FIG. 6 depicts an example book cover page and table of contents displayed on a personal viewer according to a preferred embodiment of the invention.

Inner margin to right of spine 600 (see FIG. 6) (dual display PV UI): no default use.

Inner margin to left of spine 602: no default use.

In the above list, examples of other objects that may be present in any of the margins are user annotations.

A user can reassign which functions are associated with which margin. Accordingly, the margins may be referred to as the bookmark, document, clip, and command margins, respectively. Of course, other suitable default margin arrangements could also be used. For instance, there could be a zone around the entire document that is outside the document called the edge zone or zones. The edge zones could contain command shortcuts and other kinds of links. Command and shortcuts and toolbar tabs could prefer the lower edge zone, and links representing the thumbnail view of documents could prefer the left and upper edge zones. Because a page margin would not be needed for carrying command links, clipping tabs could by default use the left margin of the left page for clippings on the left page and the right margin of the right page for clippings on the right page. The inner margins could remain unused, except if the user puts annotations or other links there.

The difference between the margins-only embodiment and the edge-zones embodiment is that, in the margins-only embodiment, the user sees no surrounding frame, and a tap action in the margins has the defaults specified in the list above. In the edge zones embodiment, the user sees a surrounding frame that is wide enough to provide an edge zone, and taps in the corresponding edge zones have the effects specified in the list above. In this latter embodiment, the default action for taps in each of the document's margins is to insert an embedded annotation (i.e., a user note). In the margins-only embodiment, the user would insert annotations into a margin not by tapping there but by explicitly invoking a command, such as an Insert Note command available on the margin's popup menu.

The display content. This is the area inside the page margins where content is displayed. Content may include links that the user can navigate by touching them, as well as user-created highlighting, jottings, and embedded notes and recordings.

The note form. This is a document template that is used to implement several important PV UI features, including bookmarks, notes, and clippings. The note form is just a blank document that has predefined fields like an entry field for a title, and option boxes to control the note's presentation and behavior (e.g., its color, type, source back link, and anchor spec). The note form can also have a Send button.

The built-in documents. The PV has a few built-in documents, as listed below. There is nothing "special" about being a built-in document; these are just documents that a PV UI happens to contain by default. The list can be customized as desired. Possible standard built-ins are:

Sign-in Page. This document provides the form for signing in if and when a PV is set in a secure mode.

Start Page. An example Start Page is depicted in FIG. 5. This is the central starting point for the PV UI. From here a user can link to any content, including UI, accessible to the user, for instance, documents on the PV itself as well as in the user's desktop workspace and the Internet. The Start Page may take the form of a personal newsletter.

My Documents 520. This is a folder listing of all the documents a user has read, authored, subscribed to, or purchased. It is essentially a catalog of a user's personal library. It supports various views to let a user get an overview of what content the user has and to find the content that the user is looking for. My Documents may have links to other PV content like the Address Book and Guide Book, for instance.

Figure 7:
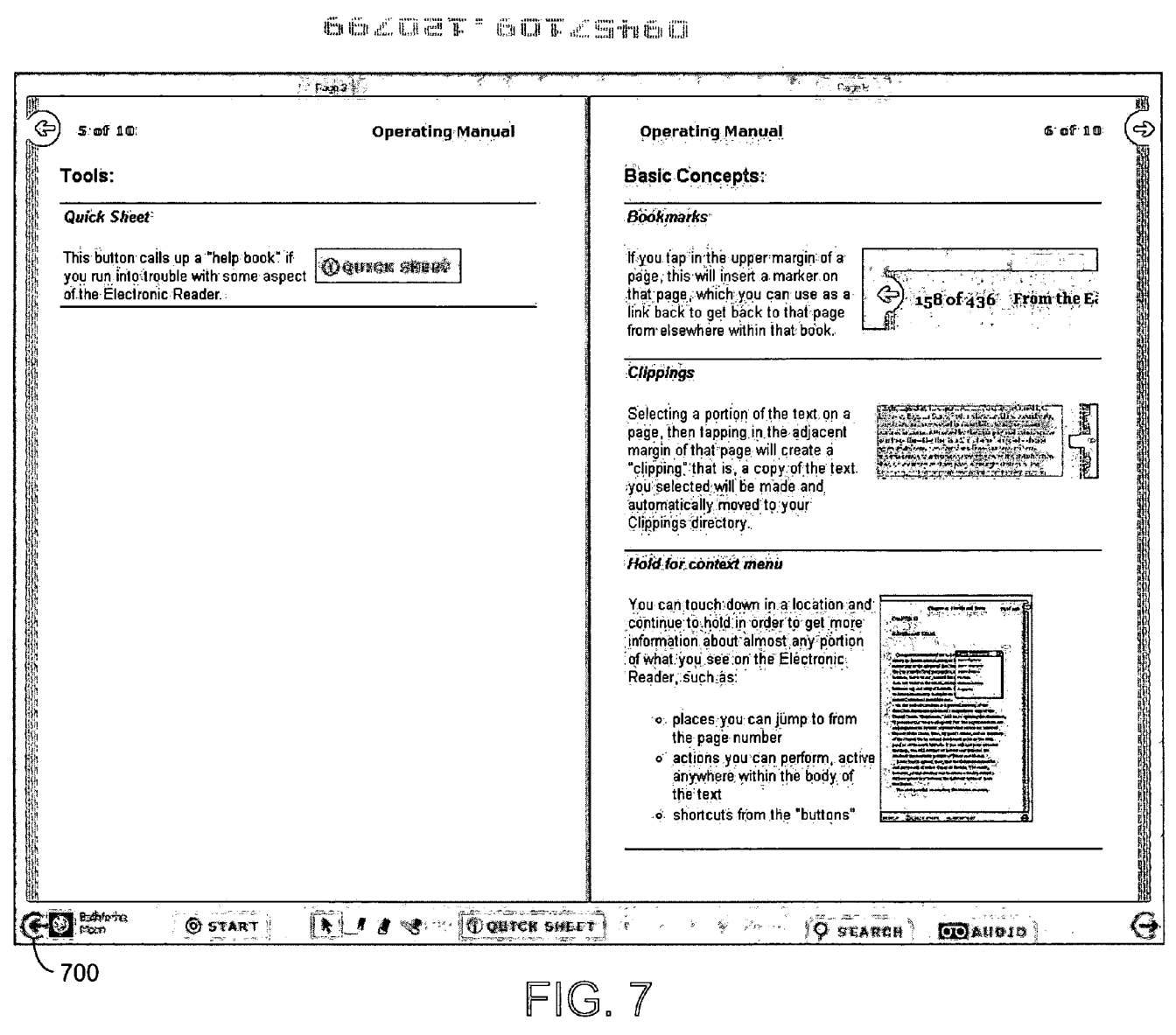
Figure 8:
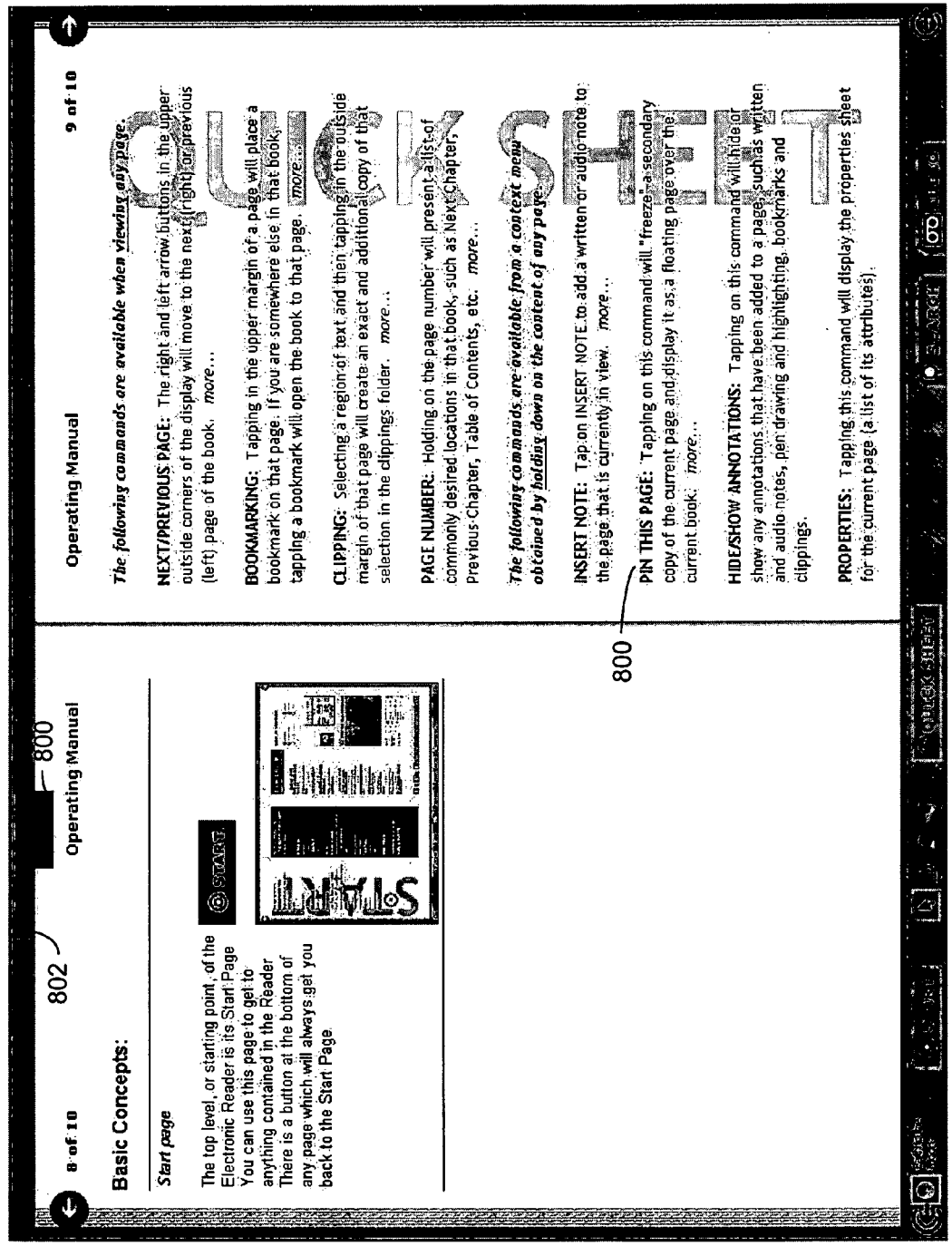
FIG. 8 depicts example Quick Help pages, one of which is bookmarked, displayed on a personal viewer according to a preferred embodiment of the invention.

Guide Book. This is both the PV's help document and the PV's user interface. Example pages of an Guide Book are shown in FIG. 7. The UI is embedded in the Guide Book as links that perform UI functions according to the principles of this invention. The Guide Book includes the Quick Help page of frequently used UI commands. FIG. 8 depicts an example Quick Help page.

Map book. A book of maps, including the current site map, history map, topic (browsing) map, net neighborhood, physical vicinity (nearby machines), and local machine.

Annotations Folder. This is a folder of the notes, clippings, bookmarks, jottings, and highlights a user has entered into the user's various documents. A user will typically be able to see each of these forms of annotations in the context of the original document to which they relate. These items are stored as external annotations in the Annotations Folder. A user does not usually view this folder, but instead views one of the following persistent views derived from the Annotations Folder.

Clippings Folder. A persistent view of the Annotations Folder, showing only clippings. The default view categorizes by document, with more recently read documents ahead of less recently read documents.

Bookmarks Folder. Same as the Clippings Folder, but showing only bookmarks.

The Notes Folder. Same as the Clippings Folder, but showing only notes.

Notebook. This is a blank document where a user can write notes that are not associated with a particular document. The notebook is provided by default because most users would like to have a notebook to write in.

The mailbox, calendar, and address book. In a preferred embodiment, these will synchronize with a user's desktop or network-based counterparts.

Personal Viewer Display Modes

A PV UI can include a single-display and/or a dual-display. Some dual-display UI actions will cause only the rightmost display image to be replaced. When this happens, the original image may or may not be shifted to the left display when this happens. A rule that can be used is that when the UI action was invoked from a link or menu action initiated on the right display, the image is shifted to the left display and the new page opens on the right. If the action was initiated on the left display, the new page simply opens on the right and no shift occurs. The result is that the new page opens on the right and the page from which it was initiated appears on the left.

For a single-display PV, the current display image is simply replaced by the new page. A user can use the Previous and Next functions to flip between the original and new pages.

A PV can be held horizontally or vertically. Further, dual-display PV's can treat the two displays as separate pages, or as halves of the same (large) page. The PV can adapt its assignment of case touch zones and display areas to present a consistent geometry to the user regardless of its orientation and display mode. That is, the PV re-maps its definition of things like "upper left corner" and "right margin" to be consistent with its current orientation.

Gestures for Performing PV UI Actions

While other suitable input equipment could also be used, PV UI actions will be described as occurring via touch operations using a fingertip or pen. Users can use a fingertip or the pen, also referred to as a stylus, interchangeably. The pen could have three tips: an erasing tip at one end, a highlighting tip at the other, and, by twisting the pen barrel to extend a small shaft, a writing tip. The fingertip may be recognized as a highlighting tip, with a gesture allowing it to erase.

The basic touch idioms are:

Tap (touch and release after a brief time). The action taken depends on where a user tapped. It does not depend on what tip the user is using. The tap would typically last a certain minimum (configurable) time, so that an accidental or glancing touch will be ignored.

Hold (touch and hold contact). The action taken depends on what the user held; usually it opens an object or its context menu. The action does not depend on what tip is being used. The hold time can be a preference parameter.

Swipe. A swipe is any continuous motion of a tip in contact with the display surface. Swiping will write or erase ink or highlighting, depending on which tip is being used. Swipes are also used to make and extend current selections.

Tap-swipe. A tap immediately followed by a swipe starting at the same spot. This causes the pen or fingertip to start a current selection region. Either the writing or highlighting tip can be used. Swiping starting at the current edit cursor location (i.e., the tap is optional when starting on top of the edit cursor) can also draw a selection.

Erase (a jiggling swipe). When done with the fingertip, this is treated as a swipe with the erasing tip. (The motion is the same as erasing with a real pencil eraser). With the pen, a user can just swipe with the erasing tip.

A user can automatically extend the range of a highlight, current selection, or erasure by holding the pen or fingertip after swiping a part of the range; that is, swipe part of the range, then hold for auto-complete to take over. The range auto-extends to end of word, sentence or line, paragraph, page, section or chapter, and document, in that order, the longer a user holds. The UI provides feedback on the extent of the selection. In tables, the selection auto-extends by cells to the end of a row or column, and then by rows or columns, depending on whether the swipe was across or down. Arbitrary rectangular blocks can be highlighted, selected, or erased by swiping a box shape around the desired area. Selecting the page number of a page selects the whole page.

Typically, whatever a user can do with a pen, the user can do with a fingertip, except write ink. While other mapping are of course possible, an example set of keyboard/mouse idioms for the pen idioms and pen tips is:

Tap is left-click

Hold is hold left button

Swipe is hold left or right button and move mouse. Swiping with left button down selects, with right down highlights. There is no need for tap-swipe.

Erase is hold both buttons and move mouse

Jotting is done via the keyboard (i.e., the user gets text instead of ink)

The mouse supports a few other idioms as follows. These and other idioms can be customized.

Right click brings up a context menu, the same one that a hold operation at this location would.

Mouse wheel does page forward and back operations.

Clicking the mouse wheel/third button links to the Quick Help page.

Navigating

Hyperlinking

One way to navigate is by hyperlinking. The PV UI renders textual hyperlinks using a visual emphasis similar to the way a prior art browser does. Tapping a link will navigate the user to the linked-to place. The user can use the Previous and Next operations to move along the link chain. The PV UI Start Page can exist as the most previous document page in the chain.

A user can also hold a link. Doing this will perform a link-specific action. The default behavior for hyperlinks is to present preview information about where the link will take the user; i.e., document name and document position information and/or a thumbnail view of the linked-to document. Continuing to hold the link could cause the preview information to expand into a navigational map of the link context emanating from the link the user is holding. Popup menu choices could also be presented allowing the user to manipulate the link, such as to change its properties.

When the user releases a held link no navigation occurs. The user can tap the link to make it navigate. If holding the link opened a navigation map, the map will persist for a short time after the user lets go. This gives the user a chance to tap a spot on the map to go there, or to hold a spot in order to preview and then to expand the map context around that point.

Next and Previous Commands

Another way to navigate is via browser-like Next and Previous commands, performed (in the default assignment) by tapping the PV's lower right and left corners 508 and 510, respectively. Specifically, these functions navigate a user along the chain of visitations caused by link operations.

Page-turning operations are not part of the next/previous chain. For example, if a user opens a book, reads the first ten pages and then does "previous", the user will return to wherever the user was before the book was opened. The user will not go back to the previous page of the current document (for that, the user can use the previous page operation 504). The distinct page-level and navigation-level functions exist because the page forward/back functions 504 and 506 take the place of the traditional scrollbar for scanning within a single document.

Scrolling is Possible

Even though the PV UI is page oriented, there are times when a scroll-oriented presentation is the only reasonable display choice. The PV UI supports this by displaying traditional scroll bars when stream-oriented presentation is required. The user may touch the scroll bars to perform the scrolling actions. This looks and works much like conventional scroll bars.

Users Can Create Links

PV UI users are not limited to the links that are authored into content; they can create their own. The PV UI implements a rich linking model in which links can have source and destination anchor ranges as well as their own properties. Despite the richness of available features, users can create links as easily as they can copy text, and all with a fingertip; the pen is not required.

Links

Displaying Links

How a link is displayed is controlled by its properties. Conventions and heuristics may be used to assign values to these properties at the time the link is created. A simple example is that when the user taps inside the content of a document, a note is created. This entails creating a note document and then creating a link leading from the spot that was tapped to the new note document. In this case the link properties are set to visualize the link as a note icon. As another example if the user highlights some text in a user document and then chooses the "Make link command", followed by the steps to complete that command, the link is made to visualize as a hotspot over the originally selected text, with the selected text changed (for example) to a blue underlined font. Unless a user changes a link's display properties, once these property-setting decisions are made, the link will typically continue to be displayed in the same way.

Figure 11:
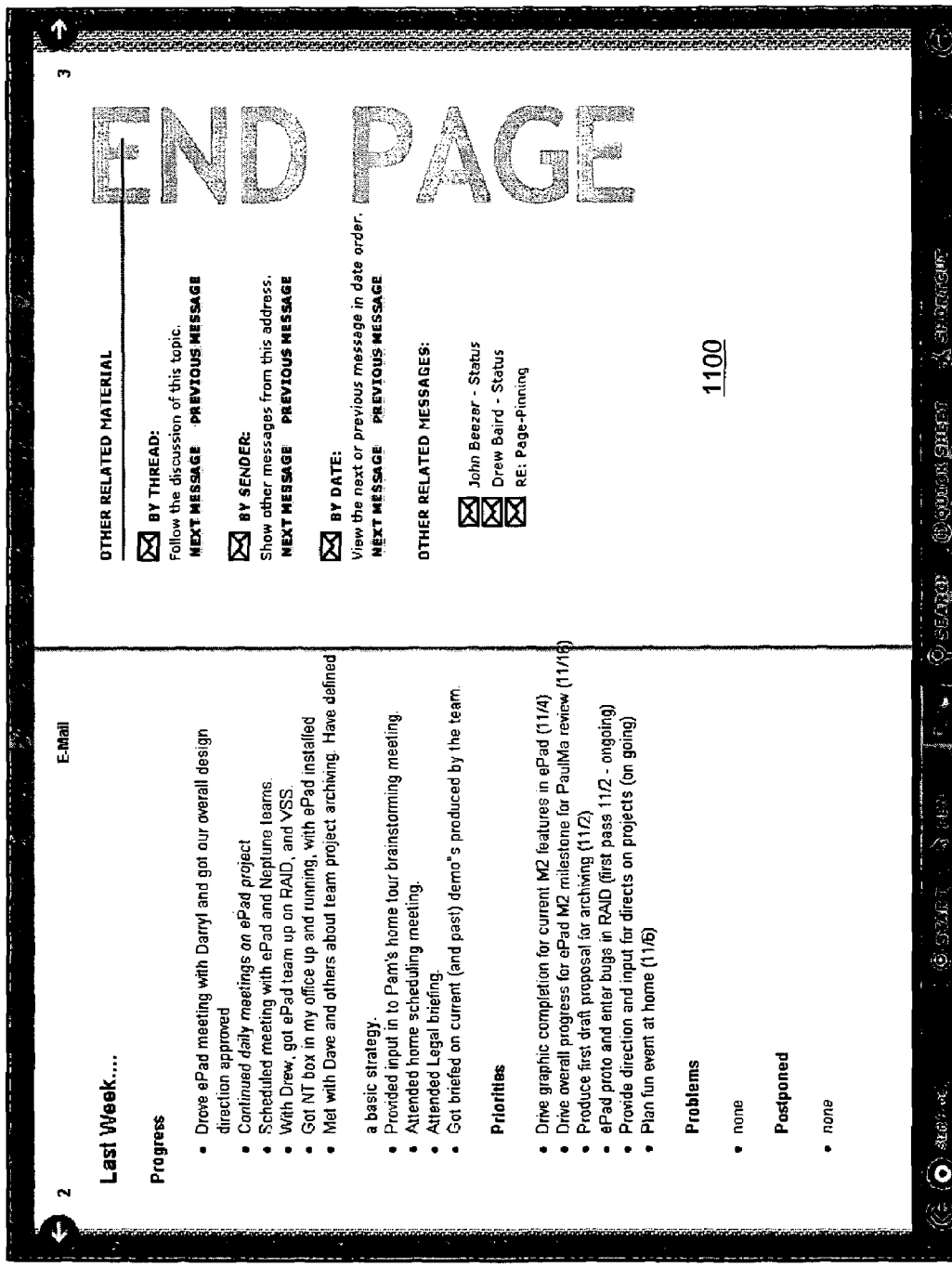
FIG. 11 depicts an example End Page displayed on a personal viewer according to a preferred embodiment of the invention.

Depending upon a link's properties, when the link is displayed, content of the linked-to document, or other information about the linked-to document, may be displayed in a frame in the linked-from document. For instance, two example previous links, previous link 700 in FIG. 7 and previous link 1102 in FIG. 11, depict how examining a link's target allows the PV UI to display information about the destination of a link. For instance, the destination of link 700 is Earth to the Moon, while the destination of link 1102 is the Start Page.

Link Property Sheet

A PV UI link property sheet, like user content and other UI pages, is implemented as a document. It has several pages. The first page is the subset of properties that users would most commonly change, presented in a way that less expert users can understand. Subsequent pages provide the full set of advanced properties and options. Typically, only the most expert user (a content author) would ever modify these.

For example, the first page may contain just the property comments (a notes field), information about where the link leads to, and a chooser that lets a user choose from a few options on how the hotspot should appear (e.g., emphasized text, button, icon, or thumbnail).

The subsequent pages give full access to properties including the source and destination anchor specifications, the visual extent and appearance of the hotspot, and the link behavior options. Each page of the link property sheet is bookmarked so a user can jump directly to it if desired.

Together, the set of link property pages encompasses a lot of information, including general properties, source and destination anchors, hotspot characteristics, and link behavior:

General properties. These include the type and file system properties of the link. Link type information describes the semantic nature of the link and how it relates the things being linked. Typically, only authoring and viewing software would ever access the type properties, as they pertain to the organization of the material containing the links. Type indicates whether the link expresses a parent, child, or peer relationship, and whether the destination represents:

A document component: a figure, table, footnote, or other cross-reference.

The next or previous "page" (in the web sense) of the current document/topic.

The next or previous document/topic in an authored web of documents/topics.

Something not part of the current document/topic: a comment or hyperlink.

Source anchor. Specifies whether the link is anchored to a character, word, paragraph, image, part of an image, table row, cell, or column, or an arbitrary range of document positions. This parameter is automatically set according to the source selection the user makes when creating the link; this property provides a way to change the anchor.

Hotspot. Specifies the physical extent and appearance of the hotspot. By default the extent matches that of the anchor, but it can be made bigger or smaller and of arbitrary shape; noncontiguous hotspots are also possible. For hotspots on text, the default appearance is blue underlined text, but the foreground and background colors and text attributes can be changed. Other appearance options include manifesting the link as an icon, button, thumbnail of the link target, or as an in-place (active) rendering of the link target. Hotspots can also be invisible, which is appropriate for links over GIF images, for instance. Another hotspot option specifies how the link is previewed: any or all of: the name of the target, a thumbnail of it, and/or specific balloon text.

Destination anchor. Specifies the target of the link and its range. The basic link creation UI results in destination anchors that are a single document position (a "point") rather than a range. Destination ranges that are not points are a very advanced feature mainly used in implementing certain viewing and collaboration features. For example, if the destination anchor is a range, the viewing software can automatically synthesize appropriate link preview information based on the content of the range.

Behavior. Specifies the action to take on tap and hold operations. Choices include Navigate. Goes to the link destination.

Preview. Pops up navigational preview information as explained above.

Run. Causes the destination content to be executed, with specified run parameters. The target is typically a command or script.

Additionally, for links set to appear as thumbnails or in-place renderings, other behavior properties could indicate latency periods for updating the display of the linked-to content relative to a change in the linked-to content by, for instance, specifying a link as hot (display updated often), warm (display updated less often than hot), or cold (display not updated). Further behavior properties could set the pre-fetch, refresh, and caching parameters for hot and warm links.

Customizable UI

The user may completely customize the PV UI (unless authored-in content controls prevent editing). Because there is no distinction between the interface and the content, the kinds of normal editing commands the user might use to alter content can be used to customize the interface.

Users Can Place Links in UI

For instance, links are not restricted to existing only in the content area of the display. They can exist anywhere. A user could, for example, place a link over a bookmark; the link would take precedence for tap operations, meaning that the bookmark would act as a document-associated shortcut to some other document; whereas a bookmark is normally a link within the current document.

Page Pinning

The PV UI display may be divided into regions in which different content may be displayed. Unlike prior art UIs, each region may be individually navigated without changing focus or "window" state. Each region may include concurrently active links that may be activated without changing focus. This aspect of the current invention is referred to as page pinning. Page pinning provides access to and interaction with multiple sources of content concurrently, while reducing the complexity associated with both the design and use of the interface.

In prior art user interfaces, each window runs a separate application that has state information associated with it. For instance the state information for a word processor might be that it is currently in insert mode, or replace mode and what the current font is. The user often has to keep in mind which application is running in which window and what the state of that application is to avoid unexpected results.

Figure 9:
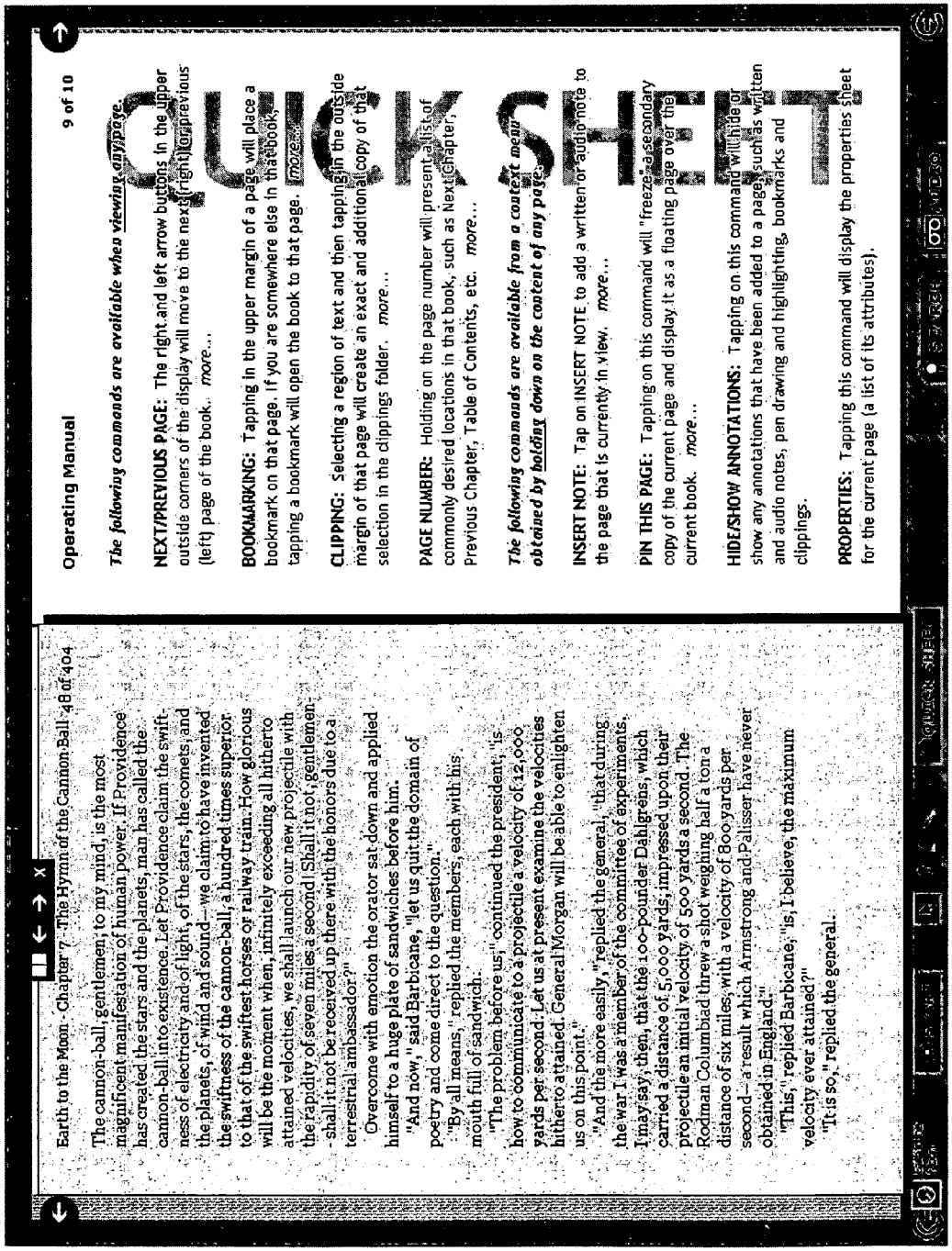
FIG. 9 depicts an example of a pinned user content page displayed on a personal viewer according to a preferred embodiment of the invention.

In the PV UI, unlike prior art user interfaces, there is no notion of a selected one of multiple windows having the current "focus." Any display region may include active links. The user can touch anywhere on the screen and will get an appropriate action based on what the user touches. For instance, if a user has a page pinned as depicted in FIG. 9, and both pages being displayed contain links the user can simply touch a link in either page and the link will be activated.

Superficially, page pinning resembles a multi-windowing user interface. The same may be said for dialog boxes that may be included in a documents-with-links UI according to the principles of this invention. Nevertheless, unlike this invention, multi-windowing UIs contain more than one UI. Each window in a multi-windowing UI gets its own UI, with its own state information, such as history information, and its own UI features, such as menu or tool bars. According to the principles of this invention, pinned pages, like all other content (the UI included), share a single UI having only one set of state information and having a unified navigational history. There are no separate UI controls, such as menu bars or tool bars, for the separate concurrently displayed pages. The unified navigational history is discussed in more detail below.

When the user has pinned a page and is viewing two pages side-by-side, the user essentially has two different view ports into a single navigation context. A set of documents exists in a navigation context. The navigation context is essentially a record of every place a user has ever navigated to and when the user navigated there. The navigation context can be thought of as a map or history of the user's navigation. A visible frame, such as a pinned page is just a view port into a single shared history. The only state associated with a displayed page-pinning frame is an indication of the document page that is currently being displayed.

Navigating Documents/Link Properties

The PV UI contains methods for paging within a document (previous/next) and for traversing chronology (history through back/forward). Attaching properties to links enables a rich model for navigation. For example, holding on a link offers additional information about where that link will lead. Link preview information could be displayed in thumbnail form and further holding could result in a graphical map of the links attached to that prospective destination. Back and forward buttons, by default, display thumbnail views of the pages that tapping that button will lead to.

Viewing History

History (which could include all the pages the user has viewed) may be viewed in a number of ways: by time, by appearance, by site, document, section, page, and the like. Since a user's navigation history is saved, the users' sequence may be viewed: as nodes with side tracking branches, as a linear list, or as a combination of most recently viewed pages and last few task categories. For example, a query could perform a multilevel categorization by document id resulting in a hierarchy that represents all the forward navigation paths a user has taken from any given document. By restricting (filtering) this categorization to a particular time frame, the navigation network as it existed at a particular point in time can be shown. Of course, other kinds of views are also possible. For example, the history can be categorized by higher level groupings like web sites or user tasks, with the results presented in alphabetical rather than time order, thus letting users return to a previous location according to the kind of information or activity, as opposed to the time during which, the location was last visited. To make certain views such as the network view more efficient to recreate, additional property information may be stored on each navigation record. Accordingly, maintaining the navigation context as a database of navigation records allows support for a rich variety of queries and views.

Applies to UI

Because the UI is built out of content, features used to search text, change viewing options on lists and tables, annotate, and the like all work for UI as well as for user content. As an example, the contents of any view, such as a view of a filing or command hierarchy, become searchable, sortable, and annotatable.

Non-Linear Navigation History

A key difference between the navigation mechanism of the PV UI and prior art browsers is that the PV UI, unlike prior art browsers, maintains a non-linear navigation history. For example, if a user navigates through a set of links then goes "back" several steps, and then navigates through a different set of links, the user is still able to go "back" and then retrace the original path of links they navigated. With prior art browser's this is not possible—recollection of the first set of documents that were "backed" over is lost.

Further, the PV UI maintains a nonlinear navigation context that records every place a user has ever navigated to, when in time the user was there, and where the user went to from there. This, in turn, allows a user to navigate from general content pages into user interface pages, perform interface functionality, and then return to the user's documents without losing what the user's navigational context was before navigating to the user interface pages. As described in more detail above in the Rich Navigation And Maintaining The User's Navigational History section, this invention automatically removes navigation from the beginning of navigation into UI pages that lead up to performance of some UI functionality so the user's navigational history does not get cluttered with navigation within UI pages. Saving the user's navigation history may also help a user retrace navigational steps that the user would not otherwise be able to remember. For instance, suppose a user does not remember where they were when they viewed some content they liked. If the user remembers where they had been before they viewed that content, then the user can navigate to this prior place and query navigational history for everywhere they had navigated to from that particular location.

This is very unlike prior art multi-windowing U's in which each application has its own navigation history that can not be integrated with the history of other applications a user is concurrently running. For example, suppose a user runs a word processor and a browser concurrently on a desktop computer. The user can switch between them in a way well known in the art. The word processor and the web browser will both have their own state information. In other words, the word processor and the web browser will each be separately nested in their own experience of history or navigation. As a result, if the user switches from the word processor to the browser, visits a few web sites and wants to return to the word processor, the user will not be able to get back to the word processor by hitting the browser's "back" button. The browser and the word processor essentially exist in separate contexts, with each context having its own state information and unique history.

Annotations

Making Annotations

The PV UI allows a user to interact with content and the UI to make either or both more memorable, via bookmarks, clippings, highlights, overlaid and embedded ink and audio notes. Bookmarks are described further in commonly assigned U.S. patent application Ser. No. 09/456,127, entitled "Bookmarking and Placemarking a Displayed Document in a Computer System", filed contemporaneously herewith, which is incorporated herein by reference. Example bookmarks 800 and 802 are depicted in FIG. 8. Ink annotations are described further in commonly assigned U.S. patent application Ser. No. 09/455,805, entitled "System And Method For Annotating An Electronic Document Independently Of Its Content", filed contemporaneously herewith, which is incorporated herein by reference. These annotations may be performed with not only different input methods, but adapted to the most convenient or natural one, such as a finger for highlighting, a stylus for writing or doodling, and speech for lengthier commentary.

Storing Annotations

Figure 10:
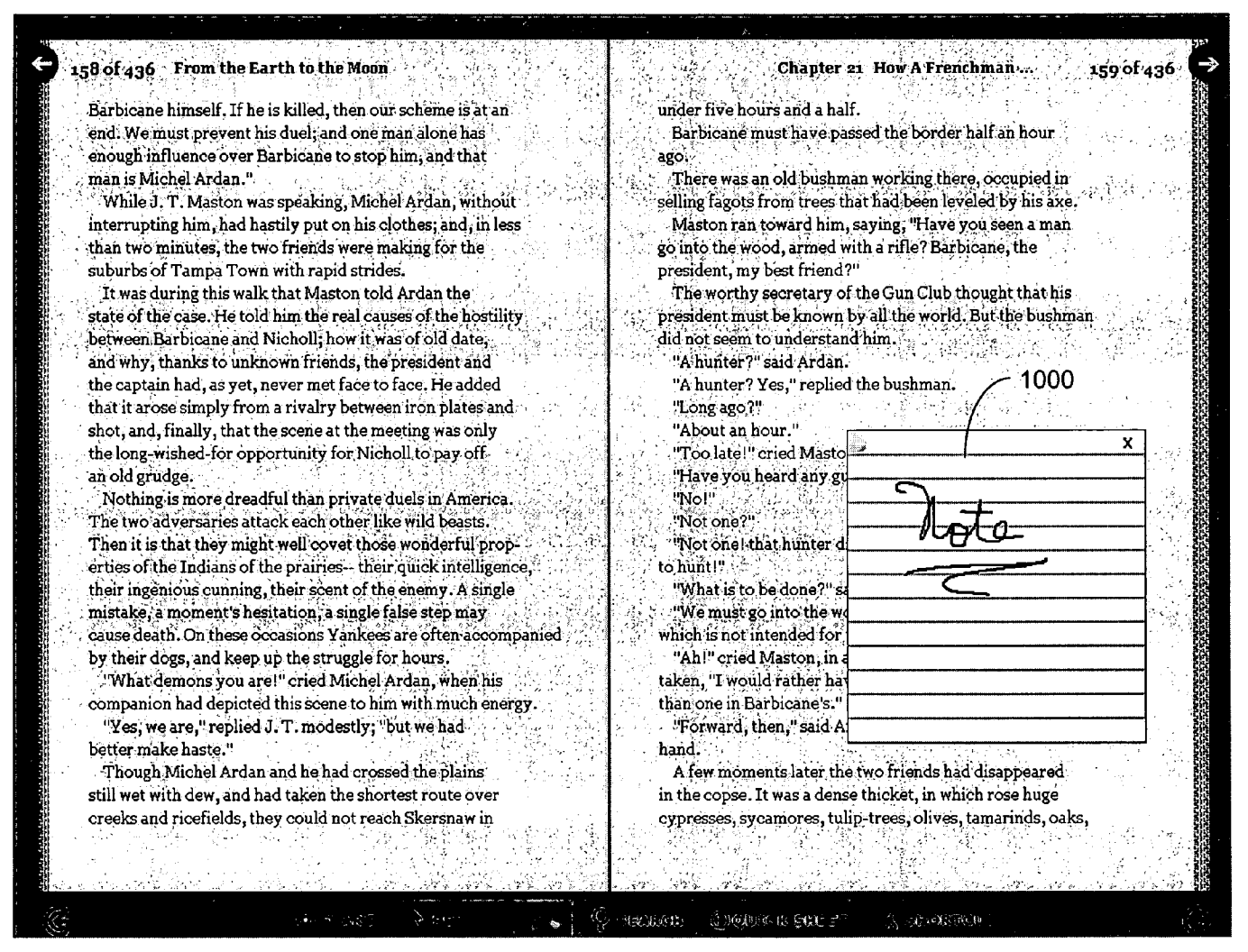

The annotations exist apart from the content (as files with links to the content); therefore annotations can be displayed not only layered on the content in appropriate positions within the content, such as, for instance, note 1000 in FIG. 10, but in other locations and visualizations. That is, each of these annotations is available to the user not only in situ, in the content where it was created, but cross-referenced in automatically-created indices which can be manipulated much as described in the Viewing History section above: by time, by appearance, by site, document, section, page, etc. Likewise, annotations could be shared, selectively shared, or kept private with the kind of functionality described in the Collaboration section below.

Interface Shortcuts and Smarts

Most-Likely-To-Use-Links and Other Heuristics

The PV UI can include heuristics, which allow it to offer up most-likely-to-use links to additional material. One case of these is the context menu that appears when the user holds the Next button; in addition to the most recent documents the user has visited subsequent to the current one, the Next menu includes heuristically determined choices of other places the user may wish to visit (for example, documents on a topic related to the current one). Another case is a feature called an End Page, such as, for instance, End Page 1100 depicted in FIG. 11. Such an End Page is essentially a summary page at the end of a document or book that offers the user related topics such as "additional works by this author/on this topic/written in the same time period/commented on by these critics" etc. In the case of directories such as email, where each message is technically a document, the end page offers threads based on that message/other messages by same author/other text on the same topic, and the like.

Of course, other heuristics could also be used depending on the context. For example, when offering up a set of command choices to a user, the heuristics could be based on analysis of the user's current document context, recently used commands, and commands the user has used most frequently in this and similar contexts in the past. Such heuristics are described further, in the context of navigating to a particular portion of the Guide Book, in commonly assigned, currently pending U.S. patent application Ser. No. 09/456,952, entitled "Method and Apparatus for Providing Help and Settings Control to Users of an Electronic Book", filed contemporaneously herewith, which is incorporated herein by reference.

Frequently Used Links

The PV UI could also provide commands (actually links) embedded in the page that are related to the kind of material on the page. In a mail message for example, "reply" "reply all," and "forward" are links so frequently used as to warrant their inclusion directly on the page. There may be other commands or links used so often that they are dynamically bubbled up, or in the case of linear reading, used so infrequently that none appear. The second level of visibility—"hold on the page for more information"—offers a more extensive list. If none of these satisfy the user's need, the user can summon the Guide Book.

Start Page

The top level of the PV UI provides the user with a Personal Newsletter or Start Page, which is the launch point for many activities. An example Start Page is depicted in FIG. 5. Highlights might include urgent mail messages, projects, PIM items, documents, news, which could be divided into system-offered default components, such as Messages, Notes, Clippings, and the like. Favorite links that the user wants to keep readily available could also be included. What appears on the Start Page can be both user-configured as well as configured from profile information the PV UI has learned by observing a user's browsing and e-mail reading patterns and the like.

User Can Modify Start Page

Advanced users can perform the same kinds of operations on the interface itself as those performed on content. If the default components on their Start Page are not to their liking, they can delete or alter even system-offered components such as Mail Messages. Or, for instance, if the automatic page number used by the bookmark header is insufficient for recognition, they can alter its text, color or any other property.

Audio Recording and Annotation

The PV UI supports the creation of audio clips that can be used for annotation of any displayed document. The clips are based on a timeline model in which audio (or video) recording is a data stream parallel to and synchronized with the material in a document. If the user has changed pages while recording, then the clip when played back will also change the page when the appropriate place in the audio clip is reached. The interface supports both document and page-specific audio notes as well as global recording. The interface is presented with cassette-like controls, including index forward/back and editing. Each clip is stored as an individual document and can be sorted and filtered to present the clips in multiple ways (all audio on a given page, all audio for a given book, audio notes in the order they were recorded, and the like). Additionally, the audio clip recorder supports intelligent VOX for hands-off note taking. A further feature is the ability to embed audio notes at specific points in the content of a document in a manner similar to creating footnotes. These audio notes can be created and played back by a single tap on the screen at the point where the audio note was (or is to be) inserted. The presence of embedded audio notes is signified by a small icon in the content that is laid out in a manner similar to a footnote symbol.

Guide Book

Because the commands in the PV UI are simply links on a document page, there is no difference between documentation, help, wizards and the other ways the PV UI helps a user perform an action. Asking for help by clicking on a help link summons an appropriate help page composed on the fly from the content of the Guide Book. The principles that underlie this composition are contextual: that is, if the user is currently in the "list" or "books" of Mail Messages, the help system infers that requests for assistance are about how to perform work with Mail Messages.

For instance, FIG. 8 shows two pages of an example Guide Book. The page on the right, page 9 of 10 includes descriptions of commands, such as the "PIN THIS PAGE" command 800. The Guide Book describes what the command does. For instance, for "PIN THIS PAGE" the description states that "Tapping on this command will "freeze" a secondary copy of the current page and display it as a floating page over the book." FIG. 9 shows an example of a pinned page. In addition to describing this command, the text "PIN THIS PAGE" is a link that, when activated, will execute the "PIN THIS PAGE" command on either the most recently selected page or on a page to be selected after activating the "PIN THIS PAGE" command link.

Obtain Help and Perform Functions in the Same Way

Unlike prior art UIs, the PV UI is constructed as a set of document pages just like a user document or a web site is constructed as set of document pages. This invention puts all of the user's content pages and user interface pages into a single grouping of information that the user can access. This invention then leverages well-known browser-like navigational capabilities to allow a user to navigate back and forth between various pages and to put links to pages in favored lists and the like. All of this is leveraged to provide the means by which a user navigates to user interface pages.

The PV UI can provide context-specific dynamically synthesized views of links to give the user direct access to relevant UI help pages. The user can search for user interface functionality in the same way the user can search other document pages. Of course, pop-up menus and other devices such as permanent links placed on the screen that give the user direct access to UI help information can also be provided.

Because the Guide Book is simply content, operations that may be performed on other types of content, such as the Start Page, the UI, and content in general may also be performed on the Guide Book. Unlike prior art user interfaces, the way a user gets help for performing a function and the way the user performs the function are the same. To perform a function and to get help for a function, the user simply activates a link.

CONCLUDING REMARKS

The foregoing has described a user interface architecture based on documents-with-links that facilitates creation of user interfaces that allow users to read, annotate, collaborate and perform other tasks typical of knowledge work, as well as alter the interface to best suit their work patterns. It will be appreciated that many modifications and variations of the invention are possible, and the specific examples and descriptions herein do not limit the scope of the invention.

I claim:

1. A computer readable medium having computer executable instructions for performing the steps of:
   providing a plurality of user interface document pages to a user, at least one of the user interface document pages having at least a first link;
   providing a plurality of user content document pages to the user, at least one of the user content document pages having at least a second link, wherein at least one of the user content document pages is an e-mail message having at least one second link within an e-mail message document page, the at lest one second link upon activation causing command code to be executed to perform an operation selected from the group consisting of: reply, reply to all, forward, and delete;
   indicating via at least one link property a display format for at least one of the first and second links;
   generating for display, in a display frame associated with a link in a linked-from document page, content of a linked-to document page;
   generating updates for the display of the linked-to content at a rate specified by a property of the link linking the linked-from and linked-to document pages;
   using heuristics to automatically provide most-likely-to-use links to additional material and to automatically provide a set of command choices to the user;
   providing at least one of the most-likely-to-use links based upon documents created during a first time period substantially the same as a time period during which a document being viewed by the user was created; and
   including at least one command in the set of command choices based upon commands the user has invoked most frequently in the past from contexts substantially the same as the user's current document context.

2. The computer-readable medium of claim 1 having further executable instruction for performing steps comprising:
   displaying, in a display frame associated with a link in the linked-from document page, information about the linked-to document page.

3. The computer readable medium of claim 1, having further executable instructions for performing steps comprising:
   providing at least one of the most-likely-to-use links based upon documents previously navigated to by the user.

4. The computer readable medium of claim 1, having further executable instructions for performing steps comprising:
   providing at least one of the most-likely-to-use links based upon documents having subject matter similar to the document being viewed by the user.

5. The computer readable medium of claim 1, having further executable instructions for performing steps comprising:
   providing at least one of the most-likely-to-use links based upon documents created by an author who is the same as an author of the document being viewed by the user.

6. The computer readable medium of claim 1, having further executable instructions for performing steps comprising:
   including at least one command in the set of command choices based upon analysis of the user's current document context.

7. The computer readable medium of claim 1, having further executable instructions for performing steps comprising:
   including at least one command in the set of command choices based upon a set of commands recently invoked by the user.

8. A computer-implement method, the method comprising:
   providing a plurality of user interface document pages to a user, at least one of the user interface document pages having at least a first link;
   providing a plurality of user content document pages to the user, at least one of the user content document pages having at least a second link, wherein at least one of the user content document pages is an e-mail message having at least one second link within an e-mail message document page, the at lest one second link upon activation causing command code to be executed to perform an operation selected from the group consisting of: reply, reply to all, forward, and delete;
   indicating via at least one link property a display format for at least one of the first and second links;
   generating for display, in a display frame associated with a link in a linked-from document page, content of a linked-to document page;
   generating updates for the display of the linked-to content at a rate specified by a property of the link linking the linked-from and linked-to document pages;
   using heuristics to automatically provide most-likely-to-use links to additional material and to automatically provide a set of command choices to the user;
   providing at least one of the most-likely-to-use links based upon documents created during a first time period substantially the same as a time period during which a document being viewed by the user was created; and
   including at least one command in the set of command choices based upon commands the user has invoked most frequently in the past from contexts substantially the same as the user's current document context.

9. The computer-implemented method of claim 8 further comprising:
   generating for display, in a display frame associated with a link in the linked-from document page, information about the linked-to document page.

10. The computer-implemented method of claim 8, further comprising:
    providing at least one of the most-likely-to-use links based upon documents previously navigated to by the user.

11. The computer-implemented method of claim 8, further comprising:
    providing at least one of the most-likely-to-use links based upon documents having subject matter similar to the document being viewed by the user.

12. The computer-implemented method of claim 8, further comprising:
    providing at least one of the most-likely-to-use links based upon documents created by an author who is the same as an author of the document being viewed by the user.

13. The computer-implemented method of claim 8, further comprising:
    including at least one command in the set of command choices based upon analysis of the user's current document context.

14. The computer-implemented method of claim 8, further comprising:
    including at least one command in the set of command choices based upon a set of commands recently invoked by the user.

15. In a computer system having processors coupled to memories configured to execute instructions for a method, the method comprising:

providing a plurality of user interface document pages to a user, at least one of the user interface document pages having at least a first link;

providing a plurality of user content document pages to the user, at least one of the user content document pages having at least a second link, wherein at least one of the user content document pages is an e-mail message having at least one second link within an e-mail message document page, the at least one second link upon activation causing command code to be executed to perform an operation selected from the group consisting of: reply, reply to all, forward, and delete;

indicating via at least one link property a display format for at least one of the first and second links;

generating for display, in a display frame associated with a link in a linked-from document page, content of a linked-to document page;

generating updates for the display of the linked-to content at a rate specified by a property of the link linking the linked-from and linked-to document pages;

using heuristics to automatically provide most-likely-to-use links to additional material and to automatically provide a set of command choices to the user;

providing at least one of the most-likely-to-use links based upon documents created during a first time period substantially the same as a time period during which a document being viewed by the user was created; and including at least one command in the set of command choices based upon commands the user has invoked most frequently in the past from contexts substantially the same as the user's current document context.

16. The method of claim 15, further comprising:

generating for display, in a display frame associated with a link in the linked-form document page, information about the linked-to document page.

17. The method of claim 16, further comprising:

providing at least one of the most-likely-to-use links based upon documents previously navigated to by the user.

18. The method of claim 16, further comprising:

providing at least one of the most-likely-to-use links based upon documents having subject matter similar to the document being viewed by the user.

19. The method of claim 16, further comprising:

providing at least one of the most-likely-to-use links based upon documents created by an author who is the same as an author of the document being viewed by the user.

20. The method of claim 16, further comprising:

including at least one command in the set of command choices based upon analysis of the user's current document context.

21. The method of claim 16, further comprising:

including at least one command in the set of command choices based upon a set of commands recently invoked by the user.

* * * * *